United States Patent
Shimomura et al.

(10) Patent No.: US 9,923,606 B2
(45) Date of Patent: Mar. 20, 2018

(54) INFORMATION READING SYSTEM, INFORMATION READING APPARATUS, STORAGE MEDIUM HAVING STORED THEREIN INFORMATION READING PROGRAM, AND INFORMATION READING METHOD

(71) Applicant: NINTENDO CO., LTD., Kyoto (JP)

(72) Inventors: Masaru Shimomura, Kyoto (JP); Shigenobu Arai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/859,880

(22) Filed: Sep. 21, 2015

(65) Prior Publication Data
US 2016/0087692 A1   Mar. 24, 2016

(30) Foreign Application Priority Data

Sep. 24, 2014  (JP) ................................. 2014-193448
Sep. 24, 2014  (JP) ................................. 2014-193449

(51) Int. Cl.
*H04Q 5/22*   (2006.01)
*A63F 9/24*   (2006.01)
(Continued)

(52) U.S. Cl.
CPC ....... *H04B 5/0062* (2013.01); *A63F 3/00643* (2013.01); *A63F 13/21* (2014.09); *A63F 13/31* (2014.09); *A63F 13/32* (2014.09); *A63F 13/34* (2014.09); *A63F 13/95* (2014.09); *A63F 13/98* (2014.09); *G06F 3/03* (2013.01); *G06F 3/046* (2013.01); *A63F 2003/00665* (2013.01);
(Continued)

(58) Field of Classification Search
CPC .. H04Q 5/22; A63F 9/24; G06F 3/041; G08B 13/14
USPC ........ 340/10.1–10.6, 505, 524, 572.1; 463/6, 463/9; 273/236
See application file for complete search history.

(56) References Cited

U.S. PATENT DOCUMENTS 6,791,452 B2 *  9/2004  Fletcher ............. G06K 7/10079
                                                    340/10.1
7,692,532 B2 *  4/2010  Fischer ................ G06K 7/0008
                                                    340/10.2
(Continued)

FOREIGN PATENT DOCUMENTS

JP   2000-163524    6/2000
WO   WO 2014/127288  8/2014

OTHER PUBLICATIONS

European Search Report (8 pages), dated Feb. 1, 2016, issued in corresponding European Application No. 15185589.7.

(Continued)

*Primary Examiner* — Nam V Nguyen

(74) *Attorney, Agent, or Firm* — Nixon & Vanderhye P.C.

(57) ABSTRACT

An information reading system performs near field communication with an information storage medium. The information reading system includes: an antenna structure including a plurality of antenna coils, each arranged across at least one of the others and each having a reading area; and a computer processor configured to perform near field communication with the information storage medium in each reading area, thereby reading information from the information storage medium in proximity to the reading area.

14 Claims, 10 Drawing Sheets

(51) Int. Cl.

| | |
|---|---|
| *G06F 3/041* | (2006.01) |
| *G08B 13/14* | (2006.01) |
| *A63F 3/00* | (2006.01) |
| *H04B 5/00* | (2006.01) |
| *G06F 3/03* | (2006.01) |
| *G06F 3/046* | (2006.01) |
| *A63F 13/21* | (2014.01) |
| *A63F 13/34* | (2014.01) |
| *A63F 13/98* | (2014.01) |
| *A63F 13/31* | (2014.01) |
| *A63F 13/32* | (2014.01) |
| *A63F 13/95* | (2014.01) |

(52) U.S. Cl.
CPC ... *A63F 2009/241* (2013.01); *A63F 2009/246* (2013.01); *A63F 2009/2458* (2013.01)

(56) References Cited

U.S. PATENT DOCUMENTS

| | | | |
|---|---|---|---|
| 7,855,779 B2 | 12/2010 | Nozawa | |
| 7,928,965 B2* | 4/2011 | Rosenblatt | G06F 3/044 178/18.03 |
| 8,269,746 B2 | 9/2012 | Hodges | |
| 8,602,857 B2* | 12/2013 | Morichau-Beauchant | A63F 3/00214 273/236 |
| 8,602,875 B2 | 12/2013 | Nguyen | |
| 9,030,420 B2 | 5/2015 | Noguchi | |
| 9,170,607 B2* | 10/2015 | Bose | G01S 5/0072 |
| 9,229,548 B2 | 1/2016 | Thompson | |
| 9,274,641 B2* | 3/2016 | Heatherly | A63F 13/02 |
| 9,367,155 B2* | 6/2016 | Wang | G06F 3/041 |
| 2001/0035815 A1 | 11/2001 | Fletcher et al. | |
| 2008/0004110 A1* | 1/2008 | Cortenraad | A63F 3/00643 463/34 |
| 2008/0161086 A1* | 7/2008 | Decre | A63F 3/02 463/14 |
| 2009/0322352 A1* | 12/2009 | Zachut | A63F 3/00643 324/658 |
| 2010/0331083 A1 | 12/2010 | Maharbiz et al. | |
| 2012/0062490 A1 | 3/2012 | Heatherly et al. | |
| 2014/0333025 A1* | 11/2014 | Amireh | A63F 1/02 273/293 |

OTHER PUBLICATIONS

European Search Report (7 pages) ), dated Feb. 1, 2016, issued in corresponding European Application No. 15185592.1.
Shimomura et al, U.S. Appl. No. 14/860,006 filed Sep. 21, 2015.
Shimomura, Office Action dated Sep. 28, 2016 issued in U.S. Appl. No. 14/860,006, filed Sep. 21, 2015 (12 pages)

* cited by examiner

F I G. 4
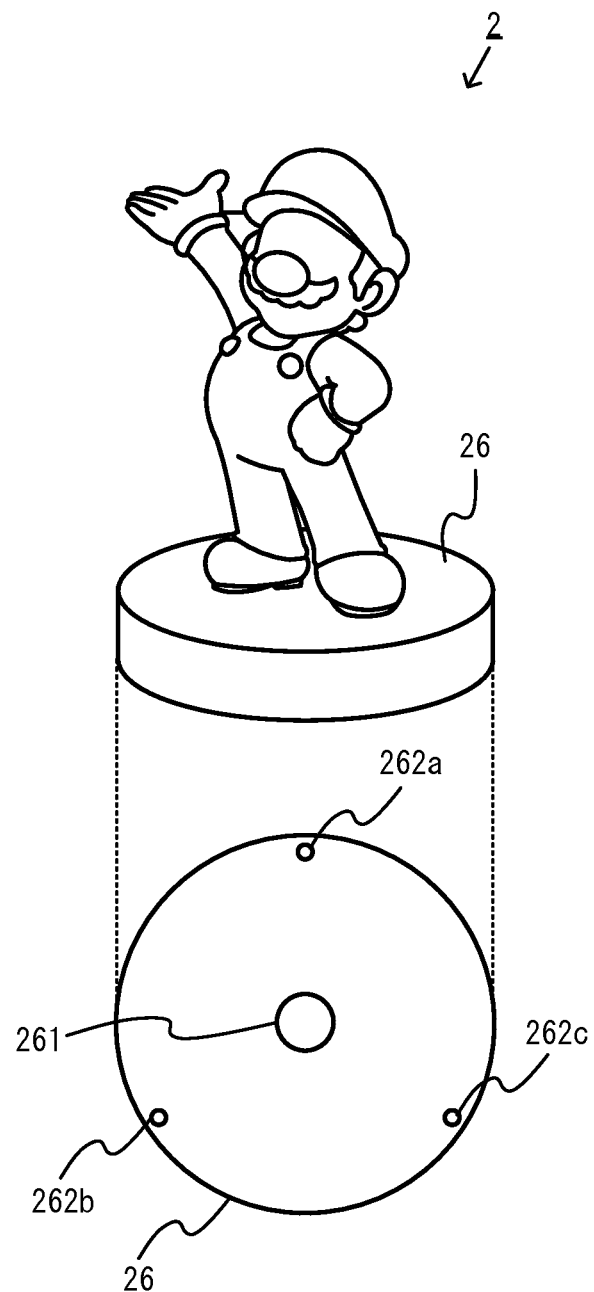

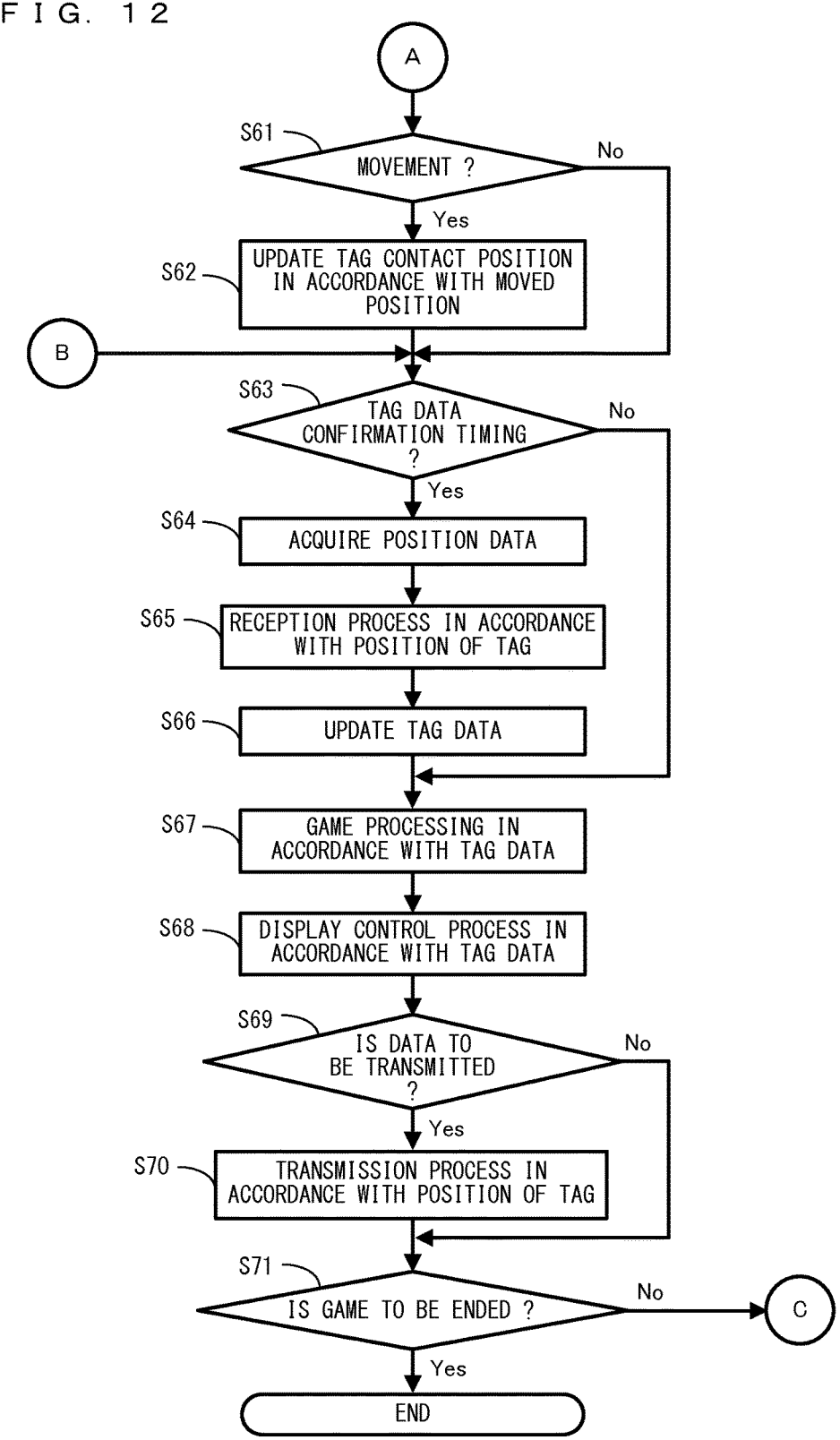

INFORMATION READING SYSTEM, INFORMATION READING APPARATUS, STORAGE MEDIUM HAVING STORED THEREIN INFORMATION READING PROGRAM, AND INFORMATION READING METHOD

CROSS REFERENCE TO RELATED APPLICATION

The disclosure of Japanese Patent Application No. 2014-193448, filed on Sep. 24, 2014 and No. 2014-193449, filed on Sep. 24, 2014, are incorporated herein by reference.

FIELD

The technology shown here relates to an information reading system, an information reading apparatus, and an information reading method for performing near field communication, and a storage medium having stored therein an information reading program for performing near field communication.

BACKGROUND AND SUMMARY

Conventionally, for example, there is a technique in which apparatuses communicate with each other using near field communication such as NFC (Near Field Communication). In near field communication, in accordance with the fact that an information storage medium (a so-called tag) approaches an information processing apparatus, the information processing apparatus and the information storage medium start communicating with each other.

If, however, the information storage medium approaches the information processing apparatus, the information storage medium merely becomes able to perform near field communication. This does not make it possible to perform processing using the positional relationship between the information storage medium and the information processing apparatus.

Therefore, it is an object of an exemplary embodiment to provide an information reading system, an information reading apparatus, and an information reading method that enable processing using the positional relationship with an information storage medium or a device, and a storage medium having stored therein an information reading program that enables processing using the positional relationship with an information storage medium or a device.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information reading system according to the exemplary embodiment, an information reading system performs near field communication with an information storage medium. The information reading system includes: an antenna structure including a plurality of antenna coils, each arranged across at least one of the others and each having a reading area; and a computer processor configured to perform near field communication with the information storage medium in each reading area, thereby reading information from the information storage medium in proximity to the reading area.

Based on the above, it is possible to read information from an information storage medium in each of a plurality of reading areas. Thus, it is possible to perform processing using the positional relationship with the information storage medium.

In addition, the information reading system may further include a touch panel. The touch panel is provided near the antenna structure and detects a position of the information storage medium. In this case, in accordance with the position of the information storage medium detected by the touch panel, information may be read from the information storage medium.

Based on the above, a touch panel detects a position. Thus, it is possible to detect the position of the information storage medium with high accuracy.

In addition, the computer processor may acquire the position of the information storage medium using a result of the detection by the touch panel, and may read information stored in the information storage medium, using near field communication via the antenna coil. In this case, the computer processor may be further configured to, based on the acquired information, determine a type of the information storage medium at the position detected by the touch panel.

Based on the above, it is possible to detect the position of the information storage medium with high accuracy and also acquire information stored in the information storage medium placed at the position, using wireless communication.

In addition, information may be read from the information storage medium via, among the plurality of antenna coils, an antenna coil corresponding to the position of the information storage medium detected by the touch panel.

Based on the above, based on the precise position of the information storage medium, it is possible to read information using an appropriate antenna coil.

In addition, among the plurality of antenna coils, in a pair of antenna coils of which the reading areas cross each other at or near the position of the information storage medium detected by the touch panel, information may be read from the information storage medium via one of the pair, and then, information may be read from the information storage medium via the other of the pair.

Based on the above, it is possible to read information about the information storage medium placed in or near an area where reading areas cross each other.

In addition, information redundant between the information read via the one of the pair and the information read via the other of the pair may be acquired as information obtained from the information storage medium present in or near an overlapping area where the reading areas cross each other.

Based on the above, redundant information is extracted, whereby it is possible to sort information acquired from the information storage medium present in or near an overlapping area.

In addition, the information reading system may further include a placement portion on which the information storage medium is placed. In this case, the antenna coils may be provided in the placement portion.

Based on the above, it is possible to stably place the information storage medium for performing near field communication. This makes it possible to cause the information reading system to function as a reader/writer apparatus in the near field communication.

In addition, in the antenna structure, the plurality of antenna coils may be each arranged across at least one of the others, thereby forming, in a matrix manner, overlapping areas where the reading areas of the antenna coils each overlap at least one of the reading areas of the other antenna coils.

Based on the above, it is possible to perform processing using the positional relationship with the information storage medium by subdividing the reading area of an antenna coil.

In addition, a plurality of information storage media may be placed so that the plurality of information storage media perform near field communication. Information from the plurality of information storage media present in the overlapping areas may be managed with respect to each of the overlapping areas.

Based on the above, it is possible to manage information from the information storage medium in each of subdivided reading areas.

In addition, the computer processor may be further configured to perform near field communication with the information storage medium via the plurality of antenna coils. In this case, the computer processor may read information from the information storage medium performing near field communication.

Based on the above, a single communication control unit controls near field communication via a plurality of antenna coils, whereby it is possible to reduce costs.

In addition, based on an antenna coil reading information, the computer processor may detect a position of the information storage medium from which the information is read.

Based on the above, the reading area of an antenna coil capable of performing wireless communication is extracted, whereby it is possible to detect that the information storage medium is placed in the reading area.

In addition, among the plurality of antenna coils, in a pair of antenna coils of which the reading areas cross each other at or near the position of the information storage medium detected based on the reading areas, information may be read from the information storage medium via one of the pair, and then, information may be read from the information storage medium via the other of the pair.

Based on the above, it is possible to read information about the information storage medium placed in or near an area where reading areas cross each other.

In addition, each of the plurality of antenna coils may perform polling to detect the presence of the information storage medium in each of the reading areas of the antenna coils.

Based on the above, each of a plurality of antenna coils performs polling, whereby it is possible to detect whether or not the information storage medium is placed in each of the reading areas of the antenna coils.

In addition, the computer processor may be further configured to display on a display screen an image based on the read information.

Based on the above, based on information read from the information storage medium in each of the plurality of reading areas, it is possible to display an image.

In addition, the display screen may be provided near the antenna structure. An image corresponding to the position of the information storage medium from which the information is read may be displayed on the display screen.

Based on the above, it is possible to display an image based on the position of the information storage medium.

In addition, in another example of the configuration of the information reading system according to the exemplary embodiment, an information reading system performs near field communication with an information storage medium. The information reading system includes: an antenna structure in which a plurality of antenna coils are arranged in a matrix manner, thereby forming reading areas of the plurality of antenna coils in the matrix manner; and a computer processor configured to perform near field communication with the information storage medium in each reading area, thereby reading information from the information storage medium in proximity to the reading area.

Based on the above, it is possible to read information from an information storage medium in each of a plurality of reading areas. Thus, it is possible to perform processing using the positional relationship with the information storage medium.

In addition, the exemplary embodiment may be carried out in the forms of an information reading apparatus, a storage medium having stored therein an information reading program, and an information reading method.

In addition, in an exemplary configuration of an information reading apparatus according to the exemplary embodiment, an information reading apparatus includes: a touch panel configured to, if a device comes into contact with a predetermined surface, detect a position of the contact; an antenna structure in which a plurality of antenna coils capable of, if the device comes into proximity to the information reading apparatus, being inductively connected with an antenna coil provided in the device are placed such that reading areas of the plurality of antenna coils are formed on the predetermined surface; and a computer processor configured to read a position of the device and/or information about the device using the antenna coils of the antenna structure inductively connected with the antenna coil provided in the device.

Based on the above, it is possible to read information from a device in each of a plurality of reading areas. Thus, it is possible to perform processing using the positional relationship with the device.

In addition, in the antenna structure, the plurality of antenna coils may be each arranged across at least one of the others, thereby forming overlapping areas where the reading areas of the antenna coils each overlap at least one of the reading areas of the other antenna coils.

Based on the above, it is possible to perform processing using the positional relationship with the device by subdividing the reading area of an antenna coil.

In addition, the touch panel may be able to detect a plurality of contact positions on the predetermined surface. In accordance with the contact positions detected by the touch panel, positions of a plurality of devices on the predetermined surface may be acquired, and pieces of information about the plurality of devices may be acquired using the antenna coils of the antenna structure inductively connected with antenna coils provided in the plurality of devices.

Based on the above, it is possible to perform processing using the positions of a plurality of devices and information about the plurality of devices.

In addition, in another example of the configuration of the information reading apparatus according to the exemplary embodiment, an apparatus includes an antenna structure in which a plurality of antenna coils are provided on a predetermined surface, and a plurality of areas are formed on the predetermined surface by the plurality of antenna coils; and a computer processor configured to, as electromotive control, selectively supply power to the plurality of antenna coils, thereby causing an antenna coil of a device in proximity to the apparatus to generate an induced electromotive force in each of the plurality of areas.

Based on the above, it is possible to cause an antenna coil of a device to generate an induced electromotive force in each of a plurality of areas.

In addition, in the antenna structure, the plurality of antenna coils may be each arranged across at least one of the others, thereby forming overlapping areas where the areas of the antenna coils each overlap at least one of the areas of the other antenna coils.

Based on the above, it is possible to cause the antenna coil of the device to generate an induced electromotive force by subdividing the area of an antenna coil.

In addition, the computer processor may be further configured to: as first electromotive control, using some of the plurality of antenna coils, cause the antenna coil of the device in proximity to the antenna coils to generate an induced electromotive force; and as second electromotive control, using the remaining antenna coils except for some of the plurality of antenna coils, cause the antenna coil of the device in proximity to the antenna coils to generate an induced electromotive force. In the electromotive control, operations may be performed in the first electromotive control and the second electromotive control, thereby supplying power to the plurality of antenna coils and causing the antenna coil of the device in proximity to the antenna coils to generate an induced electromotive force.

Based on the above, it is possible to quickly perform the process of causing the antenna coil of the device to generate an induced electromotive force.

According to the exemplary embodiment, it is possible to read information from an information storage medium or a device in each of a plurality of areas, and cause the device to generate an induced electromotive force. Thus, it is possible to perform processing using the positional relationship with the information storage medium or the device.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 is a diagram showing a non-limiting example of the external appearance of a tag 2;

FIG. 12 is a flow chart showing a non-limiting example of the second half of the communication process performed by the information processing apparatus 1 in the exemplary embodiment

DETAILED DESCRIPTION OF NON-LIMITING EXAMPLE EMBODIMENTS

Figure 1:
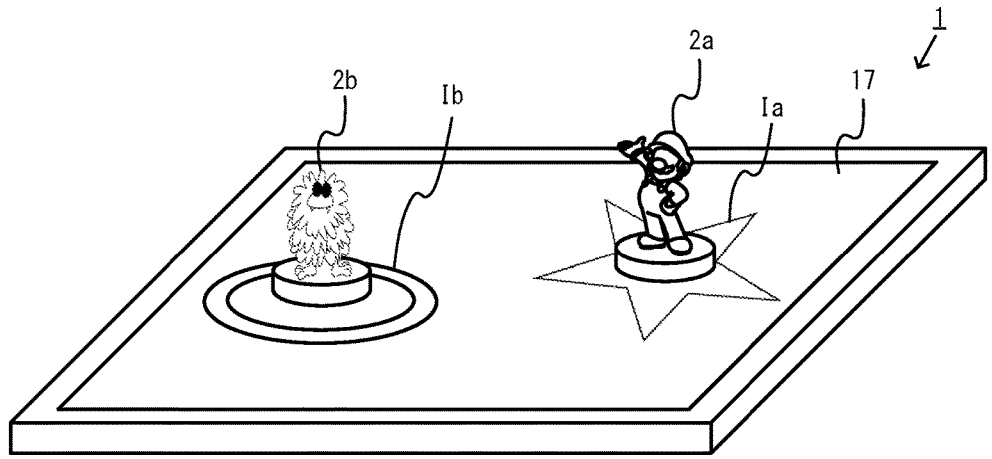
FIG. 1 is a diagram showing a non-limiting example of the external appearance of an information reading system according to an exemplary embodiment.
Figure 2:
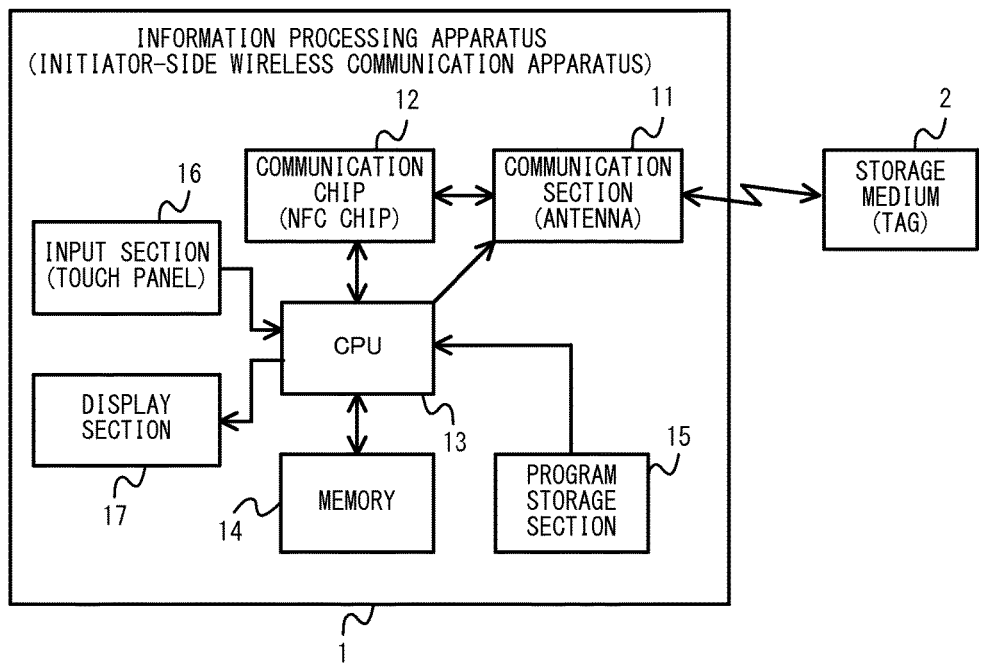
FIG. 2 is a diagram showing a non-limiting example of the configuration of the information reading system in FIG. 1.

A description is given below of an information reading system, an information reading apparatus, an information reading program, and an information reading method according to an exemplary embodiment. First, the configuration of the information reading system is described. FIG. 1 is a diagram showing an example of the external appearance of the information reading system according to the exemplary embodiment. FIG. 2 is a diagram showing an example of the configuration of the information reading system. As shown in FIGS. 1 and 2, the information reading system includes an information processing apparatus 1 and a storage medium (tag) 2. The information processing apparatus 1 is any information processing apparatus capable of performing wireless communication with the tag 2 in proximity to the information processing apparatus 1 (hereinafter occasionally referred to simply as "near field communication") and functioning as an initiator-side wireless communication apparatus (mainly an apparatus that gives a command to a communication partner apparatus) when the near field communication is performed. Further, the tag 2 is any information storage medium capable of performing near field communication with the information processing apparatus 1 and functioning as a wireless communication apparatus that serves as a target of the information processing apparatus 1 (mainly an apparatus that receives a command from an initiator-side wireless communication apparatus) when the near field communication is performed.

In the exemplary embodiment, a description is given taking as an example the case where, as an example of near field communication, communication based on the NFC standard is performed between the information processing apparatus 1 and the tag 2. Here, the term "near field communication" as used herein refers to a communication method where radio waves from an apparatus generate an electromotive force (for example, by electromagnetic induction) in another apparatus. The other apparatus can operate by the generated electromotive force (the other apparatus may or may not have a power supply). In near field communication, if the information processing apparatus 1 and the tag 2 come close to each other (typically, the distance between the information processing apparatus 1 and the tag 2 becomes dozen centimeters or less), the information processing apparatus 1 and the tag 2 become capable of communicating with each other. Further, in near field communication, radio waves continue to be transmitted while the communication between two communication apparatuses is established (a tag is close to a communication apparatus). It should be noted that in the exemplary embodiment, the information processing apparatus 1 causes the tag 2 to generate an electromotive force by electromagnetic induction, and near field communication is performed between the information processing apparatus 1 and the tag 2.

The information processing apparatus 1 is any information processing apparatus capable of performing near field communication. In the exemplary embodiment, the information processing apparatus 1 may be a mobile (or portable) apparatus such as a mobile game apparatus, a mobile phone, or a smartphone, a stationary apparatus such as a personal computer or a home game machine, or a large-sized apparatus such as a commercial arcade game apparatus. For example, the information processing apparatus 1 is a mobile device having an NFC reader/writer function.

The tag 2 is any apparatus capable of performing near field communication with the information processing apparatus 1. In the exemplary embodiment, the tag 2 is a storage medium having an NFC tag function. That is, the tag 2 includes a circuit (an IC chip) for performing near field communication and storage means (a memory or the like) for storing data. It should be noted that the tag 2 is not limited to an apparatus having only the function of storing data, and may be, for example, an information processing apparatus (a mobile device) having an NFC card emulation function.

The information processing apparatus 1 includes a display section 17 on its main surface and can perform near field communication with the tag 2 coming close to a display screen of the display section 17. Then, the information processing apparatus 1 can detect the position of the tag 2 coming close to (in contact with) the display screen of the display section 17 (a position on the display screen that is closest to (in contact with) the tag 2, which will be hereinafter referred to as a "contact position") and can perform information processing based on the contact position. For example, in the example shown in FIG. 1, on the basis of a contact position of a tag 2a on the display screen of the display section 17, an image Ia, which corresponds to the type of the tag 2a, is displayed on the display screen. Further, on the basis of a contact position of a tag 2b on the display screen of the display section 17, another image Ib, which corresponds to the type of the tag 2b, is displayed on the display screen. It should be noted that the display screen of the display section 17 can function as a placement portion on which the tag 2 is placed, by making the display screen almost horizontal. In this case, it is possible to stably place on the display screen of the display section 17 the tag 2 performing near field communication with the information processing apparatus 1 and cause the information processing apparatus 1 to function as a reader/writer apparatus in the near field communication.

An example of the configuration of the information processing apparatus 1 is described below. As shown in FIG. 2, the information processing apparatus 1 includes a communication section 11. The communication section 11 is an antenna for use in near field communication. Further, the information processing apparatus 1 includes a communication chip 12. In accordance with an instruction from a CPU 13 described later, the communication chip 12 generates a signal (radio waves) to be sent from the communication section 11 and sends the signal from the communication section 11. The communication chip 12 is, for example, an NFC chip (an NFC integrated circuit). It should be noted that in another exemplary embodiment, a communication module (for example, an NFC module) having the functions of the communication section 11 and the communication chip 12 may be connected (attached) to the information processing apparatus 1. This communication module may be configured to be attachable to and detachable from the information processing apparatus 1.

In addition, the information processing apparatus 1 includes a CPU 13 and a memory 14. The CPU 13 is an information processing section for performing various types of information processing to be performed by the information processing apparatus 1. The CPU 13 performs the various types of information processing using the memory 14.

The information processing apparatus 1 includes a program storage section 15. The program storage section 15 stores various programs (for example, a communication program and an application program) to be executed by the information processing apparatus 1. The program storage section 15 is any storage device (storage medium) accessible by the CPU 13. The program storage section 15 may be a storage section built into the information processing apparatus 1, such as a hard disk or a memory, or may be a storage medium attachable to and detachable from the information processing apparatus 1, such as an optical disc or a cartridge, or may be both the storage section and the storage medium.

In addition, the information processing apparatus 1 includes an input section 16, which receives an instruction from a user, such as a button or a touch panel. Further, the information processing apparatus 1 includes a display section 17, which displays an image generated by the above information processing. For example, the input section 16 includes an optical touch panel for detecting a position on the display screen of the display section 17. Then, the touch panel enables multi-touch for recognizing two or more input positions on the input surface of the touch panel. As an example, the input section 16 includes a touch panel using Planar Scatter Detection (PSD), which uses the phenomenon that light (for example, infrared light) is projected into cover glass provided on the surface of the display screen of the display section 17, and if an object comes into contact with the surface of the cover glass, the light traveling in the cover glass while being reflected is scattered. It should be noted that the touch panel included in the input section 16 may not be a touch panel using Planar Scatter Detection, but may be another optical touch panel, a pressure (resistive) touch panel, an electrostatic capacitance touch panel, an ultrasonic wave touch panel, an electromagnetic induction touch panel, or the like.

It should be noted that the information processing apparatus 1 may include a plurality of apparatuses. For example, in another exemplary embodiment, at least part of the information processing performed by the information processing apparatus 1 may be performed in a dispersed manner by a plurality of apparatuses capable of communicating with each other via a network (a wide-area network and/or a local network).

For example, the information processing apparatus 1 may be configured such that the CPU 13 can execute a plurality of programs such as an application program and a communication program. The application program is a program for executing any application for performing data communication with the tag 2 and may be a game program for reading game data from the tag 2 and performing game processing using the game data. The communication program is a program for performing near field communication with the tag 2. For example, the communication program is firmware or driver software for causing the communication chip 12 to operate. The communication program receives an instruction from an application and causes the communication chip 12 to perform an operation for communication.

Figure 3:
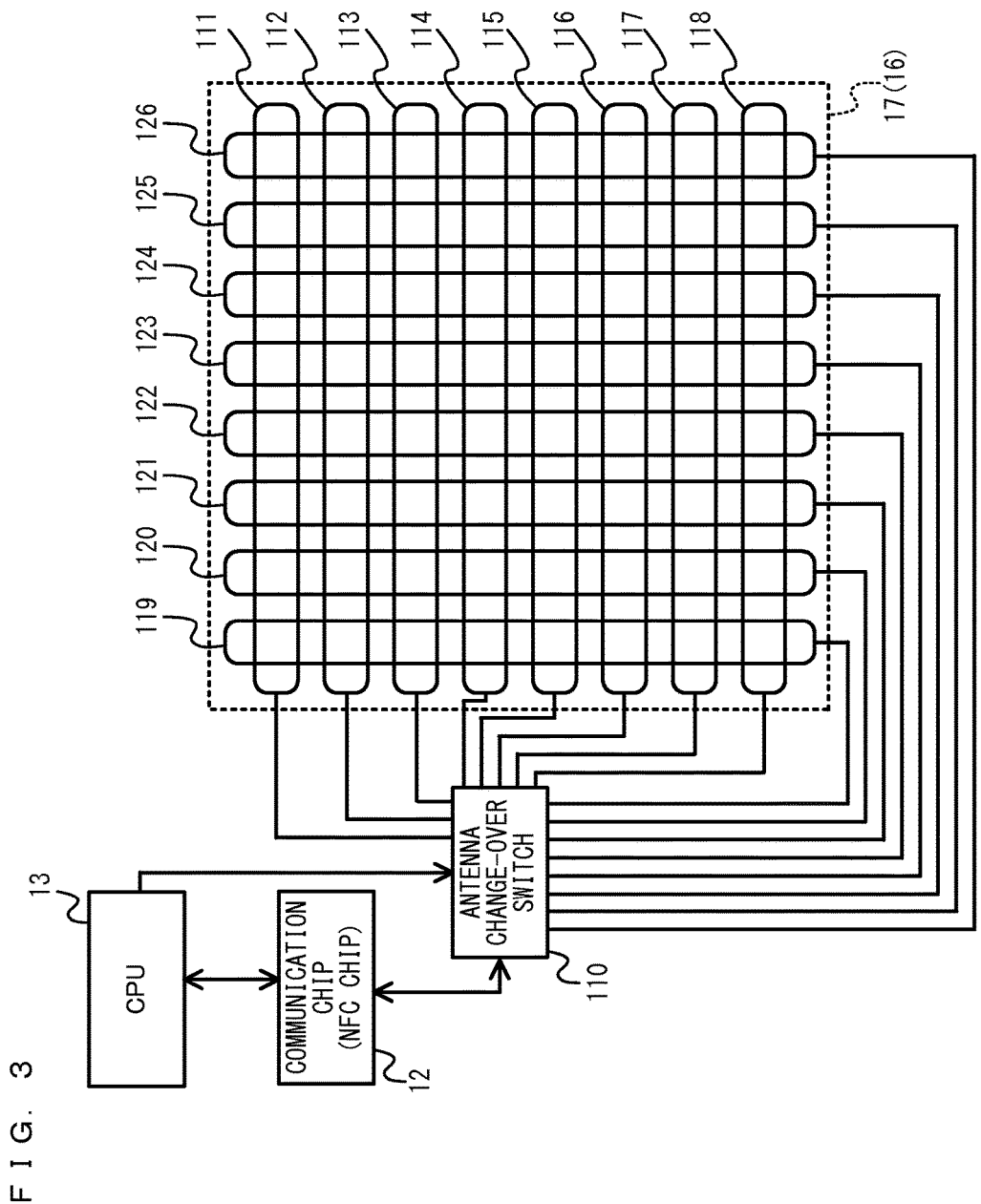
FIG. 3 is a diagram showing a non-limiting example of the configuration of a communication section 11.

Next, with reference to FIG. 3, an example of the configuration of the communication section 11 is described. It should be noted that FIG. 3 is a diagram showing an example of the configuration of the communication section 11.

In FIG. 3, the communication section 11 includes a plurality of antennas for use in near field communication performed with the tag 2 (a wireless communication target that serves as a target). In the example shown in FIG. 3, a plurality of antennas 111 to 126 are provided along the display screen of the display section 17 (that is, the input surface of the touch panel of the input section 16). Among the plurality of antennas 111 to 126, the plurality of antennas 111 to 118 have a long and narrow shape (for example, a long and narrow rounded-corner rectangle) of which the long axis direction is the left-right direction (the horizontal direction) of the display screen, and are arranged next to each other from top to bottom of the display screen. Further, among the plurality of antennas 111 to 126, the plurality of antennas 119 to 126 have a long and narrow shape (for example, a long and narrow rounded-corner rectangle) of which the long axis direction is the up-down direction (the vertical direction) of the display screen, and are arranged next to each other from left to right of the display screen and across the plurality of antennas 111 to 118. That is, the plurality of antennas 111 to 126 are arranged so as to form a matrix-shaped area along the display screen of the display section 17. Consequently, the projection surface (opening surface) of each of the antennas 111 to 126 is subdivided by the other antennas that cross the antenna. For example, the antenna 114, which is placed in the horizontal direction of the display screen, is subdivided by the plurality of antennas 119 to 126, which cross the antenna 114, into eight areas including an area where the projection surface of the antenna 114 crosses the projection surface of the antenna 119, an area where the projection surface of the antenna 114 crosses the projection surface of the antenna 120, an area where the projection surface of the antenna 114 crosses the projection surface of the antenna 121, an area where the projection surface of the antenna 114 crosses the projection surface of the antenna 122, an area where the projection surface of the antenna 114 crosses the projection surface of the antenna 123, an area where the projection surface of the antenna 114 crosses the projection surface of the antenna 124, an area where the projection surface of the antenna 114 crosses the projection surface of the antenna 125, and an area where the projection surface of the antenna 114 crosses the projection surface of the antenna 126.

In addition, the communication section 11 includes an antenna change-over switch 110, with which the communication chip 12 switches antennas for use in near field communication. In accordance with an instruction from the CPU 13 (the instruction may be given via the communication chip 12), the antenna change-over switch 110 connects any one of the plurality of antennas 111 to 126 and the communication chip 12. Consequently, in accordance with an instruction from the CPU 13, the communication chip 11 generates a signal (radio waves) to be sent from the communication section 11 and sends the signal from any one of the plurality of antennas 111 to 126 selected via the antenna change-over switch 110. Further, if a signal is received from any selected one of the plurality of antennas 111 to 126, the communication chip 12 acquires the signal via the antenna change-over switch 110.

FIG. 4 is a diagram showing an example of the external appearance of the tag 2. As shown in FIG. 4, the tag 2 according to the exemplary embodiment is a figure-shaped tag of which the external appearance represents a character. The character represented by the tag 2 is a character that appears in a particular application (for example, a game) executable by the information processing apparatus 1. The user can cause the character to appear in the particular application, using the tag 2. That is, when executing a program of the particular application, the information processing apparatus 1 uses data stored in the tag 2 to cause the character to appear in a virtual space generated by the program of the application. It should be noted that the figure-shaped tag 2 represents any object that appears in an application, but may represent not only a character but also an item in a game application.

As described above, the tag 2 is used in the particular application program. Although the details will be described later, the tag 2 can store data (dedicated data described later) that can be used only in the particular application program. It should be noted that the particular application program corresponding to a single type of tag may be of a single type or a plurality of types. For example, if a plurality of types of applications are provided as a single series of applications, the plurality of types of applications may be the particular application program.

It should be noted that the tag 2 may be able to be used in the particular application program and may also be able to be used in another application program. That is, the tag 2 stores data that can be used only in the particular application program and also stores data that can be used also in another application program other than the particular application program.

On the bottom surface of a pedestal 26 of the tag 2, a plurality of protruding portions 261 and 262a to 262c are formed. The protruding portion 261 is formed in an almost central portion of the bottom surface of the tag 2 and is formed into a size that enables the touch panel to detect the position of the protruding portion 261 when the bottom surface of the tag 2 is brought into contact with the display screen of the display section 17 (that is, the input surface of the touch panel of the input section 16). The plurality of protruding portions 262a to 262c are formed near an outer edge portion of the bottom surface of the tag 2. The plurality of protruding portions 262a to 262c come into contact with the display screen when the tag 2 is placed on the display screen, and are formed into sizes that do not enable the touch panel to detect the positions of the protruding portions 262a to 262c. For example, the plurality of protruding portions 262a to 262c are provided in three places at regular intervals on the outer edge of the bottom surface of the tag 2 and are formed so that the tag 2 can be stably placed on the display screen. It should be noted that when the plurality of protruding portions 262a to 262c come into contact with the display screen, the protruding portion 261 may have a projection height that comes into contact with the display screen, or the protruding portion 261 may have a projection height that does not come into contact with the display screen on which the touch panel can detect a position.

Figure 5:
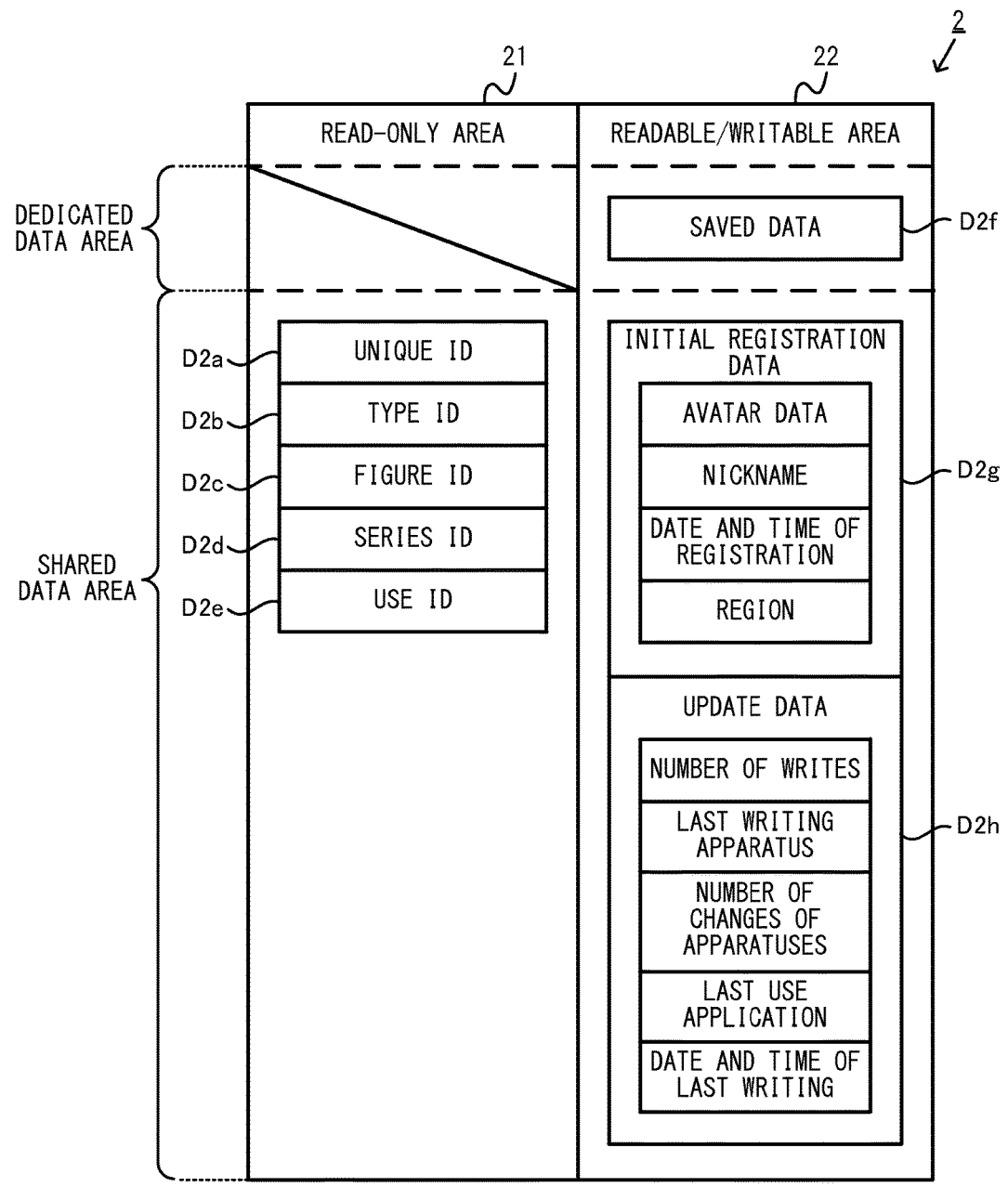
FIG. 5 is a diagram showing a non-limiting example of data stored in the tag 2.

FIG. 5 is a diagram showing an example of data stored in the tag 2. In the exemplary embodiment, as shown in FIG. 5, the tag 2 includes a read-only area 21 and a readable/writable area 22. The read-only area 21 is a storage area where it is only possible to read data. The readable/writable area 22 is a storage area where it is possible to read and write data. The read-only area 21 is a storage area where data is stored at the time of manufacture of the tag 2, and the writing of data is prohibited after that (after the shipping of the tag 2). That is, the information processing apparatus 1 (an application executed by the information processing apparatus 1) cannot write data to the read-only area 21. On the other hand, the information processing apparatus 1 (an application executed by the information processing apparatus 1) can read and write data from and to the readable/writable area 22. It should be noted that at the time of the shipping of the tag 2, data may or may not be stored in advance in the readable/writable area 22. In either case, if the tag 2 and the information processing apparatus 1 communicate with each other, the information processing apparatus 1 writes data to the readable/writable area 22, and the data is stored in the readable/writable area 22.

In addition, in the exemplary embodiment, broadly, two types of data including dedicated data and shared data are stored in the tag 2. It should be noted that as shown in FIG. 5, in the exemplary embodiment, it is assumed that storage areas (a dedicated data area and a shared data area) where these pieces of data are stored are determined in advance. Alternatively, in another exemplary embodiment, these storage areas may not be determined The dedicated data is data that can be used only in the above particular application program. In the exemplary embodiment, the dedicated data includes saved data D2$f$ of the particular application program (see FIG. 5). As the saved data D2$f$, for example, data representing a parameter regarding the character represented by the tag 2, data representing the progress state of the game of the particular application program, data regarding a player in the game of the particular application program, and/or the like are stored. It should be noted that in the exemplary embodiment, the dedicated data is stored in the readable/writable area 22 and is not stored in the read-only area 21 (see FIG. 5).

Next, the shared data is described. The shared data is data that can be used regardless of whether or not the program is the particular application program. In the exemplary embodiment, the shared data is stored in both the read-only area 21 and the readable/writable area 22. It should be noted that the tag 2 may store the shared data only in either one of the read-only area 21 and the readable/writable area 22.

In the read-only area 21, as the shared data, at least unique ID data D2$a$, type ID data D2$b$, figure ID data D2$c$, series ID data D2$d$, use ID data D2$e$, and the like may be stored.

For example, the unique ID data D2$a$ is data representing identification information unique to the tag 2. Here, an NFC tag such as the tag 2 in the exemplary embodiment stores identification information unique to the tag, termed a UID (Unique ID). The unique ID data D2$a$ is data representing information different from that of the UID. The unique ID data D2$a$ is data representing an ID assigned to the tag 2 aside from the UID so that a provider of a service using the tag 2 can easily manage the tag 2.

The figure ID data D2$c$ is data representing identification information unique to the external appearance (the shape and the color) of the figure-shaped tag 2. The figure ID data D2$c$ is data representing identification information that allows the unique identification of the type of the figure of the tag 2. For example, if there are a plurality of types of tags different in external appearance (for example, different in pose or clothing) for a single character, a figure ID having a different value is set for each tag. In this case, the figure ID data D2$c$ may include data representing an ID unique to the character and an ID indicating the difference such as pose or clothing.

It should be noted that an application program executable by the information processing apparatus 1 includes information about a figure ID of a tag used (that can be used) by the information processing apparatus 1. For example, the value of a figure ID included in the application program and the value of a figure ID stored in the tag 2 coincide with each other, the application program can use the dedicated data stored in the tag 2. That is, a figure ID can also be said to be identification information for managing the use of the dedicated data stored in the tag 2.

The series ID data D2$d$ is data representing identification information unique to a group to which an object (a character) represented by the tag 2 belongs. For example, if the character represented by the tag 2 appears in a plurality of types of applications (for example, a series of game applications), the plurality of types of applications may be set as a single group, and data representing a group ID indicating this group may be set as the series ID data D2$d$.

The type ID data D2$b$ is data representing identification information indicating the type of the tag 2. In the exemplary embodiment, the information processing apparatus 1 can also use a card-type tag, as well as a figure-shaped tag such as the tag 2. The type ID data D2$b$ is data representing identification information indicating a figure-shaped tag or a card-type tag as the type of tag. It should be noted that in another exemplary embodiment, any type of tag can be identified by the type ID data D2$b$. For example, different type IDs may be assigned to respective manufacturers providing the tag 2.

The use ID data D2$e$ is data representing identification information for identifying an application program (a particular application program) that can use the dedicated data stored in the tag 2. Here, a use ID is assigned to an application program executable by the information processing apparatus 1. In the exemplary embodiment, a figure ID is used to manage the use of the dedicated data stored in the tag 2. Alternatively, in another exemplary embodiment, a use ID may be used to manage the use of the dedicated data stored in the tag 2.

In addition, as shown in FIG. 5, in the readable/writable area 22, as the shared data, initial registration data D2$g$ and update data D2$h$ are stored. It should be noted that the content of the shared data stored in the tag 2 is any content. For example, in another exemplary embodiment, the tag 2 may store only either one of the initial registration data D2$g$ and the update data D2$h$ as the shared data.

The initial registration data D2$g$ is data registered by the user when the use of the tag 2 is started by the information processing apparatus 1. It should be noted that typically, the initial registration data D2$g$ is stored in the tag 2 at the timing when the tag 2 is first used. Alternatively, the initial registration data D2$g$ may be stored in the tag 2 at any timing. That is, the user may register data in the tag 2 at any timing. For example, the initial registration data D2$g$ may include data representing avatar data, a nickname, the date and time of registration, a region, and the like.

The avatar data is data of an avatar of the user. The avatar data includes data used by the information processing apparatus 1 to generate an avatar and display the avatar on the display section 17. Specifically, the avatar data includes data representing parts (the shapes of the eyes, nose, and the like, the habitus, and the like) of the avatar. It should be noted that in the exemplary embodiment, it is assumed that a program for generating an avatar using the avatar data is stored in the information processing apparatus 1. In the exemplary embodiment, a program for generating an avatar is stored in advance in the information processing apparatus 1, and each application program can display the avatar.

The nickname is a nickname given to the tag 2 by the user. For example, if a single user owns two or more tags having the same external appearance, nicknames different from each other are given to these tags, whereby it is possible to distinguish each tag. When an initial registration process is performed on the tag 2, the information processing apparatus 1 may cause the user to input avatar data and a nickname. In this case, the input data is stored in the tag 2 as the initial registration data D2g together with data of the date and time of registration and the region described later.

The date and time of registration is the date and time when initial registration has been performed. Further, the region is the region where initial registration has been performed. For example, data of the date and time of registration and the region may be automatically written to the tag 2 by the information processing apparatus 1 in the initial registration process.

Next, information included in the update data D2h is described. The update data D2h is data of which the content is updated (under a certain condition) when the tag 2 and the information processing apparatus 1 communicate with each other. For example, the update data D2h may include data representing the number of writes, a last writing apparatus, the number of changes of apparatuses, a last use application, the date and time of the last writing, and the like. For example, the update data D2h stored in the tag 2 may be updated (overwritten) at the timing when the dedicated data is written.

The number of writes is the number of times the dedicated data has been written to the tag 2. The last writing apparatus is an information processing apparatus having written the dedicated data to the tag 2 last. For example, if unique identification information is assigned to each information processing apparatus, the identification information or a hash value of the information processing apparatus having written the dedicated data may be stored as data of the writing apparatus. The number of changes of apparatuses is the number of times information processing apparatuses for writing the dedicated data have been changed. For example, if an information processing apparatus of the user writes the dedicated data to the tag 2, and then, an information processing apparatus different from the information processing apparatus of the user (for example, an information processing apparatus installed in a store where the user has gone to, or an information processing apparatus of a friend of the user) writes the dedicated data to the tag 2, the number of changes of apparatuses is incremented. The last use application is an application program having written the dedicated data to the tag 2 last. For example, as data of the last use application, not the above use ID but data of identification information unique to each application program may be stored. The date and time of the last writing is the date and time when the dedicated data has been written to the tag 2 last.

It should be noted that the dedicated data and the shared data may be encrypted by a method that enables the information processing apparatus 1 to decrypt the dedicated data and the shared data. It should be noted that the encryption method of the dedicated data and the encryption method of the shared data may be the same or may be different. Thus, even if an apparatus that does not have a decryption function by the above method reads the dedicated data and the shared data from the tag 2, the apparatus cannot decipher the contents of the dedicated data and the shared data. This can improve the security of data in the tag 2. It should be noted that in another exemplary embodiment, one of the dedicated data and the shared data may not be encrypted.

Figure 6:
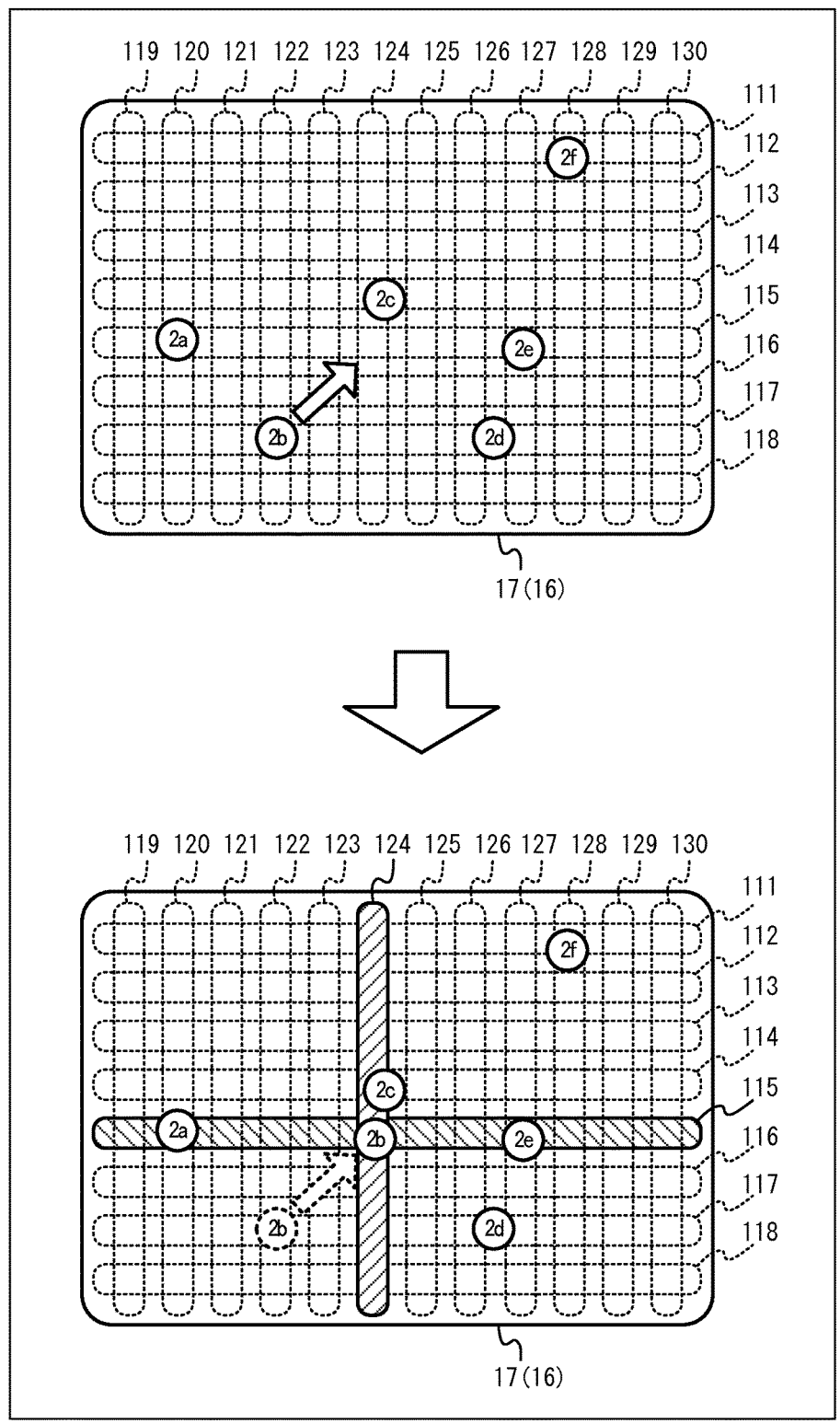
FIG. 6 is a diagram illustrating a non-limiting example where an information processing apparatus 1 and the tag 2 communicate with each other in the information reading system.

Next, with reference to FIG. 6, an operation regarding communication in the information reading system is described. It should be noted that FIG. 6 is a diagram illustrating an example where the information processing apparatus 1 and the tag 2 communicate with each other in the information reading system.

If a tag 2 is placed on the display screen of the display section 17, the information processing apparatus 1 manages the contact position of the tag 2 and data representing the type and the situation of the tag 2 (for example, the shared data of the tag 2). For example, the information processing apparatus 1 acquires the contact position of the tag 2 based on position detection data from the touch panel of the input section 16 and acquires the shared data from the tag 2 through near field communication, thereby acquiring data representing the type and the situation of the tag 2. As shown in FIG. 6, if a plurality of tags 2a to 2f are placed on the display screen of the display section 17, the information processing apparatus 1 performs near field communication with each of the plurality of tags 2a to 2f, thereby managing the contact position and the above data of each of the plurality of tags 2a to 2f.

For example, a case is considered where the tag 2b, which is placed near an area where the projection surface of the antenna 117 crosses the projection surface of the antenna 122 (hereinafter referred to as a "first area"), moves close to an area where the projection surface of the antenna 115 crosses the projection surface of the antenna 124 (hereinafter referred to as a "second area"). If the tag 2b moves away from the display screen in the first area, or if the tag 2b moves along the display screen from the first area, the information processing apparatus 1 detects the movement of the tag 2b using position detection data output from the touch panel. Then, if the tag 2b is placed on the display screen in the second area, the information processing apparatus 1 detects, using position detection data output from the touch panel, that some object is placed in the second area.

At this time, the information processing apparatus 1 sequentially supplies power to antennas related to the second area, thereby attempting near field communication with the object placed in the second area. For example, the information processing apparatus 1 supplies power to the antenna 115, thereby communicating with tags (tags 2a, 2b, and 2e in the example shown in FIG. 6) with which the information processing apparatus 1 can perform near field communication via the antenna 115. Then, the information processing apparatus 1 acquires the pieces of shared data from these tags. Then, the information processing apparatus 1 supplies power to the antenna 124, thereby communicating with tags (tags 2b and 2c in the example shown in FIG. 6) with which the information processing apparatus 1 can perform near field communication via the antenna 124. Then, the information processing apparatus 1 acquires the pieces of shared data from these tags. Next, the information processing apparatus 1 compares the pieces of shared data acquired in the communication and determines that the tag having transmitted common shared data is the tag having moved to the second area. Then, based on the shared data transmitted from the tag having moved to the second area, the information processing apparatus 1 determines that a tag having the shared data (that is, the tag 2b) is placed in the second area. Then, the information processing apparatus 1 manages the contact position of the tag 2b and the shared data of the tag 2b.

It should be noted that the above example has been described using the case where the tag 2b moves. However, even if a tag does not move, it is also possible to similarly manage the contact position of the tag and the shared data of the tag. For example, even if a plurality of tags 2 are fixedly placed on the display screen, the information processing apparatus 1 can detect the contact position of each of the tags 2 using position detection data output from the touch panel. Then, based on the detected contact position of each of the tags 2, the information processing apparatus 1 performs communication as described above to extract common shared data, and thereby can manage the type and the situation of the tag 2 placed in each contact position.

In addition, as described above, the contact position of the tag 2 is acquired based on position detection data from the touch panel of the input section 16, whereby it is possible to manage a precise contact position. If, however, such effects are not desired, the placement position of the tag may be managed as described above without using position detection data from the touch panel. For example, as shown in FIG. 7, the contact position of the tag 2 and the type and the situation of the tag 2 may be managed using only near field communication between the information processing apparatus 1 and the tag 2.

Figure 7:
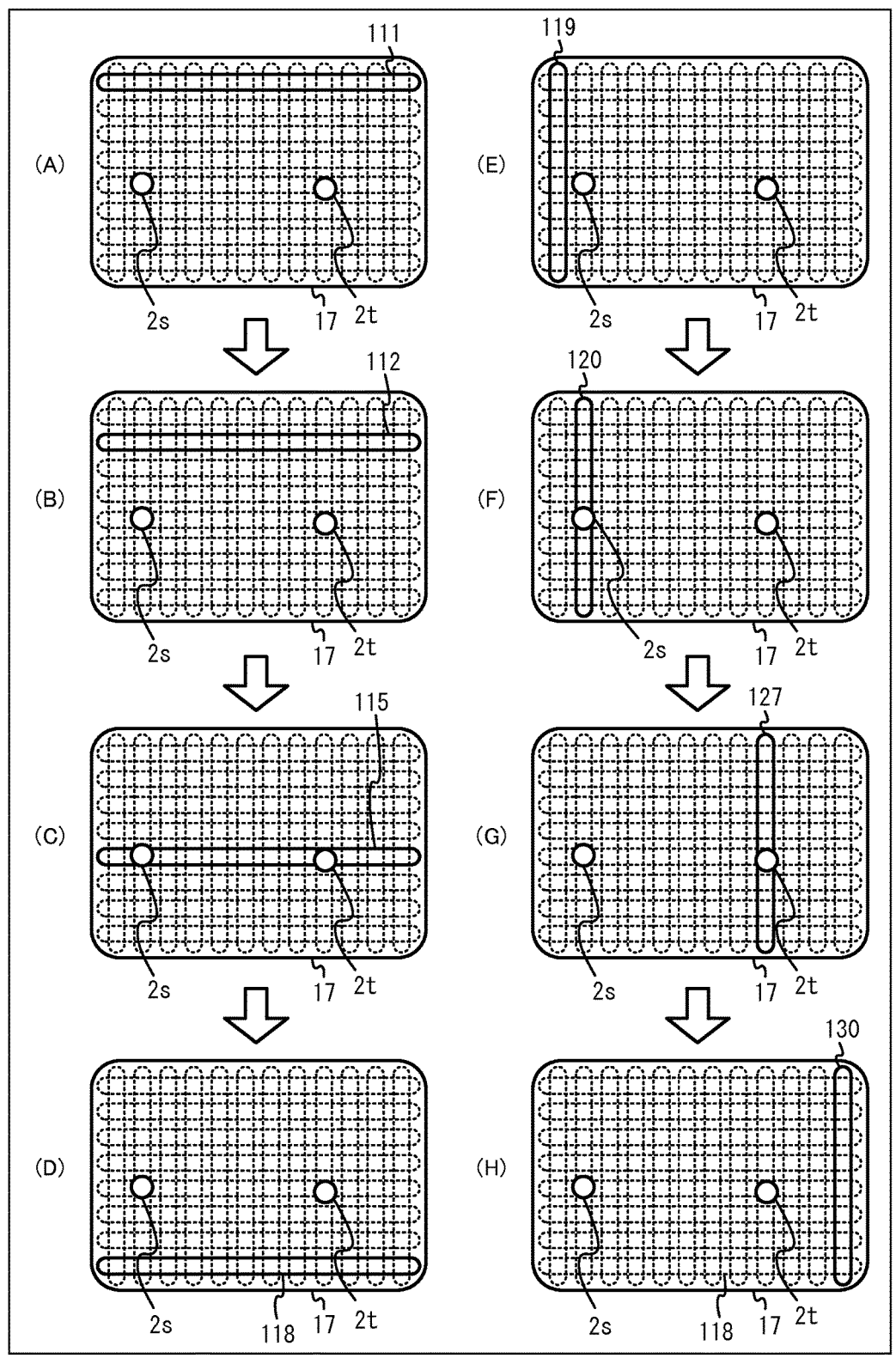
FIG. 7 is a diagram showing a non-limiting example where the contact position of the tag 2 and the type and the situation of the tag 2 are managed using only near field communication between the information processing apparatus 1 and the tag 2.

For example, a case is considered where as shown in FIG. 7, two tags 2s and 2t are placed on the display screen of the information processing apparatus 1, and the contact positions of the tags 2s and 2t and the types and the situations of the tags 2s and 2t are managed. First, to confirm the presence of the tag 2 on the display screen, the information processing apparatus 1 performs a polling process on each of the antennas 111 to 130. As an example, the information processing apparatus 1 sends to each of the antennas 111 to 130 via the communication section 11 radio waves (a polling signal (also referred to as a "polling command")) for confirming the presence of the tag 2. Specifically, the information processing apparatus 1 periodically sends to each of the antennas 111 to 130 a polling signal for confirming the presence of the tag 2 as a target and detects an influence caused by the coupling between the tag 2 and a coil (changes in the amplitude and the phase of the antenna voltage of the communication section 11), thereby detecting the presence of the tag 2. For example, the information processing apparatus 1 sets a magnetic field strength that serves as a reference in a polling signal transmission state. If a change in the magnetic field is detected in which the amount of change from the reference magnetic field strength is equal to or greater than a predetermined amount, it is determined that the tag 2 is present near the projection surface of the antenna to which the polling signal is sent. As a result of the polling process, if the tag 2 is not detected, the polling process via another antenna is repeatedly performed (the states of (A) and (B) of FIG. 7).

As shown in (C) of FIG. 7, if the presence of the tag 2 is detected by the polling process via the antenna 115, the information processing apparatus 1 performs the process of establishing communication with the tag 2 (for example, the process of acquiring information necessary for data communication from the tag 2). Then, the information processing apparatus 1 communicates with the tag 2 via the communication section 11 and acquires data (for example, the shared data) from the tag 2. In the example shown in (C) of FIG. 7, the information processing apparatus 1 acquires the shared data from each of the tags 2s and 2t via the antenna 115.

If the data communication process with the tags 2s and 2t ends, the information processing apparatus 1 continuously and sequentially performs the polling process via another antenna (the states of (D) and (E) of FIG. 7). Then, as shown in (F) of FIG. 7, if the presence of the tag 2 is detected by the polling process via the antenna 120, the information processing apparatus 1 performs the process of establishing communication with the tag 2. Then, the information processing apparatus 1 communicates with the tag 2 via the communication section 11 and acquires data (for example, the shared data) from the tag 2. In the example shown in (F) of FIG. 7, the information processing apparatus 1 acquires the shared data from the tag 2s via the antenna 120.

If the data communication process with the tag 2s ends, the information processing apparatus 1 continuously and sequentially performs the polling process via another antenna. Then, as shown in (G) of FIG. 7, if the presence of the tag 2 is detected by the polling process via the antenna 127, the information processing apparatus 1 performs the process of establishing communication with the tag 2. Then, the information processing apparatus 1 communicates with the tag 2 via the communication section 11 and acquires data (for example, the shared data) from the tag 2. In the example shown in (G) of FIG. 7, the information processing apparatus 1 acquires the shared data from the tag 2t via the antenna 127.

If the data communication process with the tag 2t ends, the information processing apparatus 1 continuously and sequentially performs the polling process via another antenna (the state of (H) of FIG. 7). Then, if the polling process via all the antennas ends, then based on the data acquired from the tag 2 and the antenna used to acquire the data, the information processing apparatus 1 determines the contact position of the tag 2 and the type and the situation of the tag 2.

For example, in the above example of the data communication process with the tag 2, the information processing apparatus 1 acquires the shared data from each of the tags 2s and 2t via the antenna 115 and acquires the shared data from the tag 2s via the antenna 120. Consequently, the information processing apparatus 1 determines that the tag 2s having transmitted common shared data is present near an area where the projection surface of the antenna 115 and the projection surface of the antenna 120 cross each other. Further, the information processing apparatus 1 acquires the shared data from each of the tags 2s and 2t via the antenna 115 and acquires the shared data from the tag 2t via the antenna 127. Consequently, the information processing apparatus 1 determines the tag 2t having transmitted common shared data is present near an area where the projection surface of the antenna 115 and the projection surface of the antenna 127 cross each other. Then, based on the above results of the determinations, the information processing apparatus 1 manages the position (the contact position) and the shared data of each of the tags 2s and 2t.

It should be noted that if the contact position of the tag 2 and the type and the situation of the tag 2 are managed using only near field communication between the information processing apparatus 1 and the tag 2, it may take a long time to perform the polling process. To shorten such a polling time, the polling process may be efficiently performed by simultaneously supplying power to a plurality of antennas. For example, FIG. 8 is a diagram showing another example of the configuration of the communication section 11, which can simultaneously supply power to a plurality of antennas.

Figure 8:
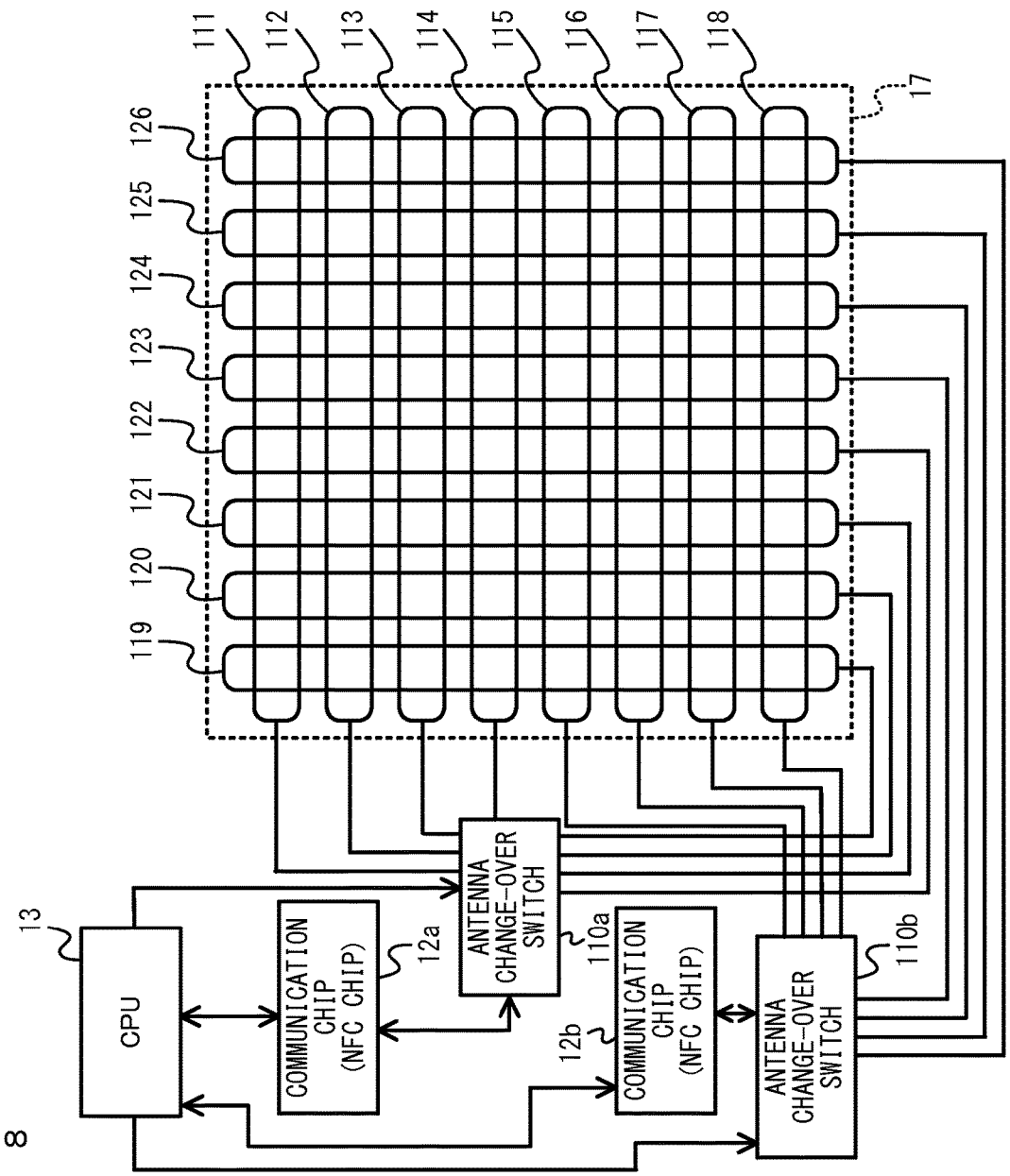
FIG. 8 is a diagram showing another non-limiting example of the configuration of the communication section 11, which can simultaneously supply power to a plurality of antennas.

In FIG. 8, another example of the communication section 11 similarly includes a plurality of antennas 111 to 126 for use in near field communication performed with the tag 2. The arrangement of the plurality of antennas 111 to 126 on the display screen of the display section 17 is similar to that of the antennas described with reference to FIG. 3 and therefore is not described in detail here.

Another example of the communication section 11 includes a plurality of communication chips 12*a* and 12*b*. Then, the communication chip 12*a* includes an antenna change-over switch 110*a*, with which the communication chip 12*a* switches antennas for use in near field communication. Further, the communication chip 12*b* includes an antenna change-over switch 110*b*, with which the communication chip 12*b* switches antennas for use in near field communication. In accordance with an instruction from the CPU 13, the antenna change-over switch 110*a* connects any one of the plurality of antennas 111 to 114 and 119 to 122 and the communication chip 12*a*. Further, in accordance with an instruction from the CPU 13, the antenna change-over switch 110*b* connects any one of the plurality of antennas 115 to 118 and 123 to 126 and the communication chip 12*b*. Consequently, in accordance with an instruction from the CPU 13, the communication chip 11*a* generates a signal (radio waves) to be sent from the communication section 11 and sends the signal from any one of the plurality of antennas 111 to 114 and 119 to 122 selected via the antenna change-over switch 110*a*. Further, in accordance with an instruction from the CPU 13, the communication chip 11*b* generates a signal (radio waves) to be sent from the communication section 11 and sends from any one of the plurality of antennas 115 to 118 and 123 to 126 selected via the antenna change-over switch 110*b*. Thus, the communication section 11 performs the operation of causing each of the two communication chips 12*a* and 12*b* to send or receive a signal, and thereby can simultaneously send or receive signals to or from selected two antennas. It should be noted that the term "simultaneously" used herein may include a time lag. Then, if a signal is received from at least one of the selected two of the antennas 111 to 126, the communication chips 12*a* and/or 12*b* acquire the signal via the antenna change-over switches 110*a* and/or 110*b*. More specifically, the CPU 13 controls the combination of two antennas for simultaneously sending signals so that these antennas do not cross each other. That is, if the antenna change-over switch 110*a* selects any one of the plurality of antennas 111 to 114, the CPU 13 controls the antenna change-over switch 110*b* to select any one of the plurality of antennas 115 to 118. If the antenna change-over switch 110*a* selects any one of the plurality of antennas 119 to 122, the CPU 13 controls the antenna change-over switch 110*b* to select any one of the plurality of antennas 123 to 126. Consequently, it is possible to send polling signals simultaneously using a plurality of antennas. This can shorten the time required to perform the polling process. Further, even if power is simultaneously supplied to a plurality of antennas, the antennas do not interfere with each other. This enables an accurate data communication process.

It should be noted that in another example of the communication section 11 described above, an example has been used where the communication chip 12*a* communicates via the antennas selected using the antenna change-over switch 110*a*, and the communication chip 12*b* communicates via the antennas selected using the antenna change-over switch 110*b*. Alternatively, similar communication may be performed using a single communication chip. In this case, in accordance with an instruction from the CPU 13, a single communication chip 12 generates signals (radio waves) to be sent from the communication section 11 and simultaneously sends the signals from any one of the plurality of antennas 111 to 114 and 119 to 122 selected via the antenna change-over switch 110*a* and from any one of the plurality of antennas 115 to 118 and 123 to 126 selected via the antenna change-over switch 110*b*.

In addition, in the above example, the polling process is performed, thereby determining whether or not the tag 2 is present near the projection surface of each antenna. Alternatively, the presence of the tag 2 may be determined by another communication process. For example, without performing the above polling process, the information processing apparatus 1 may make a data transmission request on the premise that the tag 2 is present. Then, if the tag 2 is present, the information processing apparatus 1 may receive data corresponding to the data transmission request, thereby detecting the presence or absence of the tag 2.

In addition, when the contact position of the tag 2 and the type and the situation of the tag 2 are managed using only near field communication between the information processing apparatus 1 and the tag 2 and after the contact position of the tag 2 is confirmed, power may be supplied only to an antenna corresponding to the contact position, thereby periodically communicating with the tag 2 to confirm the presence of the tag 2. Only an antenna corresponding to the contact position of the tag 2 is thus set as a power supply target, whereby it is possible to expect a power saving effect in the information processing apparatus 1.

Figure 9:
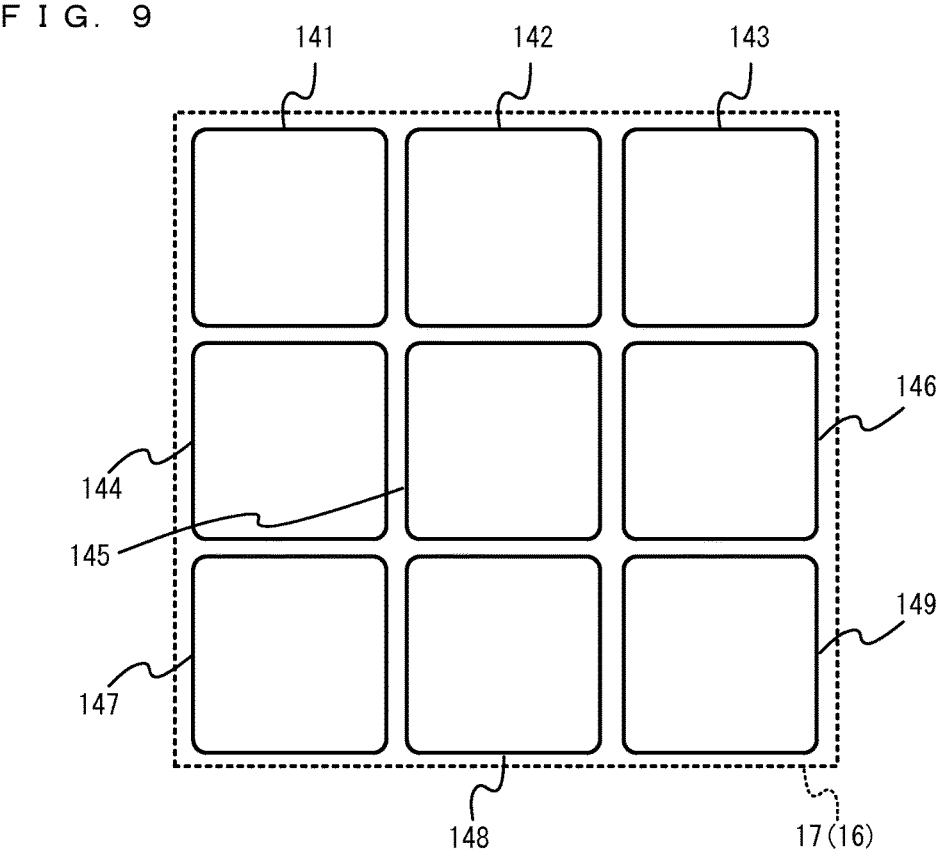
FIG. 9 is a diagram showing a non-limiting example where the projection surfaces per se of antennas are arranged in a matrix manner.

In addition, in the above description, an example has been used where a plurality of antennas are each arranged across at least one of the others, thereby subdividing the projection surface of each antenna into a plurality of areas so that the areas are arranged in a matrix manner. Alternatively, the antennas included in the communication section 11 may not cross each other. For example, as shown in FIG. 9, a plurality of antennas included in the communication section 11 may not cross each other, and the projection surfaces per se of the antennas may be arranged in a matrix manner. In the example shown in FIG. 9, the projection surfaces of nine antennas 141 to 149 are disposed in a 3×3 matrix. As described above, even if a plurality of antennas do not cross each other and the antennas are arranged next to each other along the display screen of the display section 17, it is possible to determine whether or not the tag 2 is present in each area into which the display screen is divided, and it is also possible to receive data from the tag 2 in the area. Thus, it is possible to similarly manage the position (the contact position) of the tag 2 described above and the shared data of the tag 2.

Figure 10:
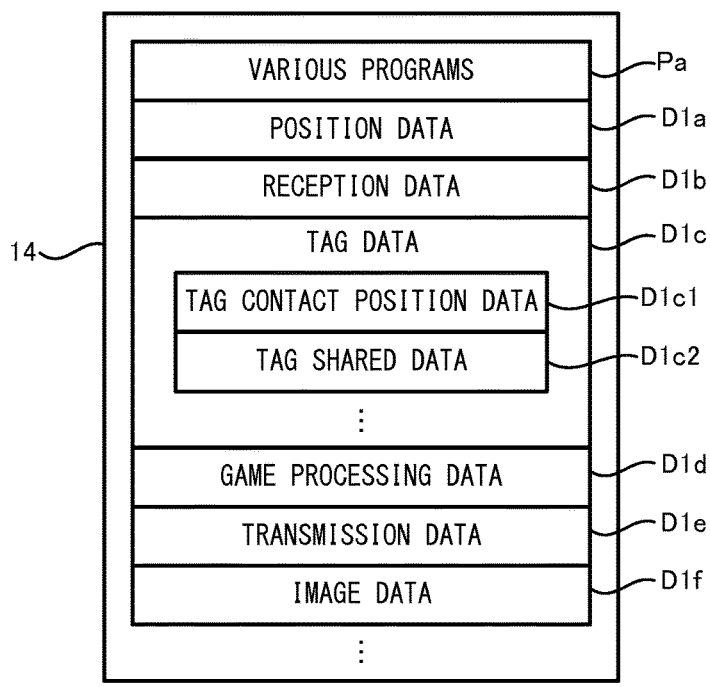
FIG. 10 is a diagram showing a non-limiting example of a data area set in a memory 14 of the information processing apparatus 1 in the exemplary embodiment.
Figure 11:
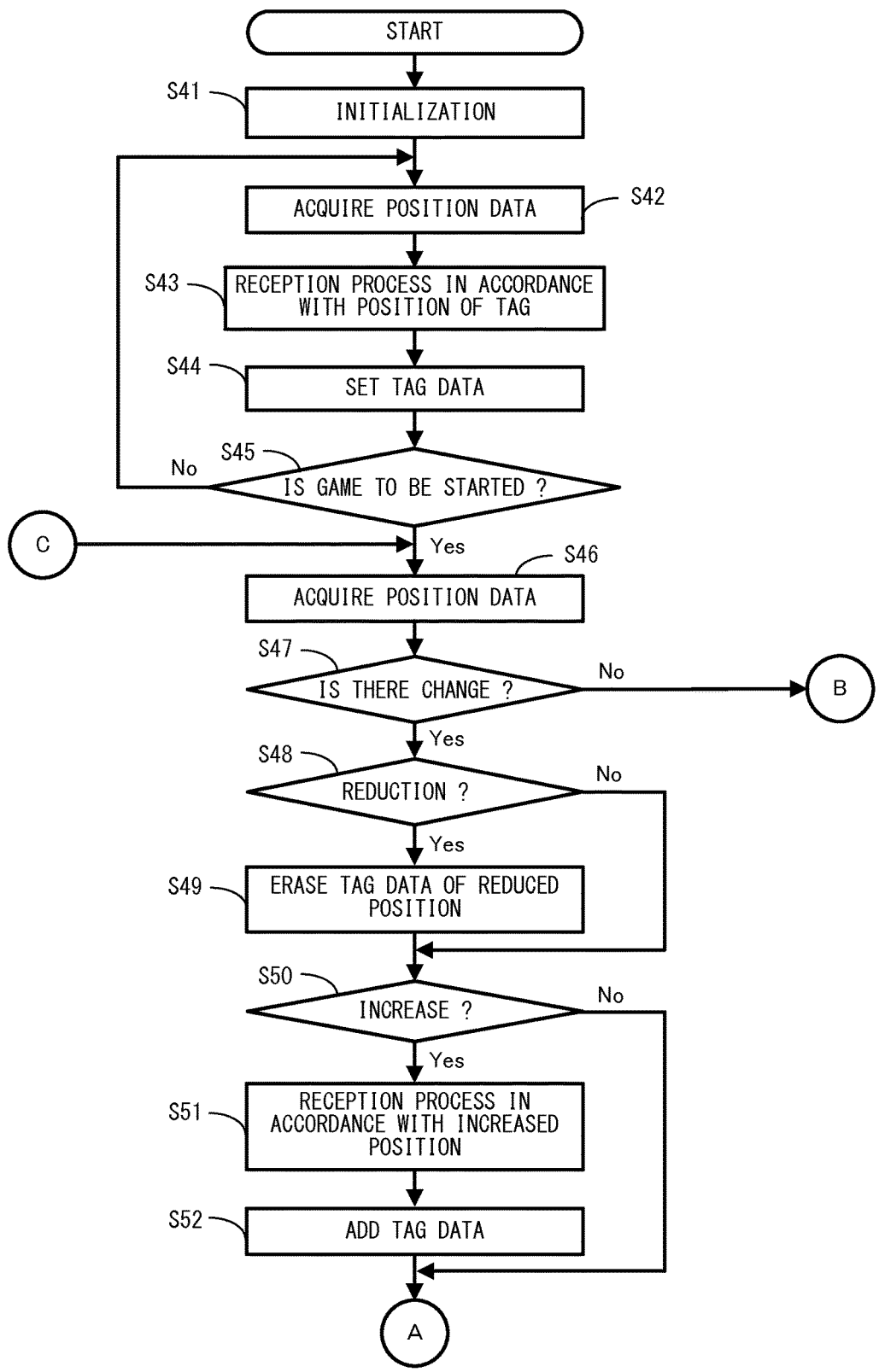
FIG. 11 is a flow chart showing a non-limiting example of the first half of a communication process performed by the information processing apparatus 1 in the exemplary embodiment.

Next, with reference to FIGS. 10 to 12, a description is given of an example of specific processing performed by the information reading system (the information processing apparatus 1) in the exemplary embodiment. FIG. 10 is a diagram showing an example of a data area set in the memory 14 of the information processing apparatus 1 in the exemplary embodiment. It should be noted that the memory 14 stores, as well as data shown in FIG. 10, data used in other types of processing. The data, however, is not described in detail.

In a program storage area of the memory 14, various programs Pa to be executed by the information processing apparatus 1 are stored. In the exemplary embodiment, as the various programs Pa, the above communication program for performing near field communication, an application program (the above particular application program) for performing information processing (for example, game processing) using the tag 2, and the like are stored. It should be noted that the various programs Pa may be stored in advance in the program storage section 15, or may be acquired from a storage medium attachable to and detachable from the information processing apparatus 1 and stored in the memory 14, or may be acquired from another apparatus via a network such as the Internet and stored in the memory 14. The CPU 13 executes the various programs Pa stored in the memory 14.

Further, in a data storage area of the memory 14, various types of data used in the communication process and the information processing to be performed by the information processing apparatus 1 are stored. In the exemplary embodiment, the following are stored in the memory 14: position data D1$a$; reception data D1$b$; tag data D1$c$; game processing data D1$d$; transmission data D1$e$; image data D1$f$; and the like.

The position data D1$a$ is data output from the input section 16 and particularly is data representing an input position detected by the touch panel. The reception data D1$b$ is data received from the tag 2 when the above data communication process is performed. The tag data D1$c$ is data managed for each tag of which the presence is confirmed. The tag data D1$c$ includes tag contact position data D1$c$1, tag shared data D1$c$2, and the like. The tag contact position data D1$c$1 is data representing a position on the display screen on which the tag is placed. The tag shared data D1$c$2 is data received from the tag and representing the shared data of the tag. The game processing data D1$d$ is data used to perform a game using the tag. The transmission data D1$e$ is data to be transmitted to the tag 2 when the above data communication process is performed. The image data D1$f$ is data for displaying an image on the display section 17 when the above game is performed.

Next, a detailed example of the communication process in the exemplary embodiment is described. FIG. 11 is a flow chart showing an example of the first half of the communication process performed by the information processing apparatus 1 in the exemplary embodiment. FIG. 12 is a flow chart showing an example of the second half of the communication process performed by the information processing apparatus 1 in the exemplary embodiment. In the exemplary embodiment, a series of processes shown in FIGS. 11 and 12 is performed by the CPU 13 executing the communication program and a predetermined application program included in the various programs Pa. It should be noted that the communication process shown in FIGS. 11 and 12 may be started at any timing. Further, in FIGS. 11 and 12, all the steps performed by the CPU 13 are abbreviated as "S".

It should be noted that the processes of all the steps in the flow charts shown in FIGS. 11 and 12 are merely illustrative. Thus, the processing order of the steps may be changed, or another process may be performed in addition to (or instead of) the processes of all the steps, so long as similar results are obtained. Further, in the present exemplary embodiment, a description is given on the assumption that the CPU 13 performs the processes of all the steps in the flow charts. Alternatively, a processor or a dedicated circuit other than the CPU 13 may perform the processes of some of the steps in the flow charts.

Referring to FIG. 11, the CPU 13 performs the initialization of information processing (for example, game processing) using the tag 2 (step 41), and the processing proceeds to the next step. For example, in the initialization, the CPU 13 initializes a parameter for performing the following processing (for example, the game processing using the tag 2).

Next, the CPU 13 acquires, from the input section 16 (the touch panel), data regarding an operation indication position (a contact position) on the display screen of the display section 17 (step 42), and the processing proceeds to the next step. For example, the CPU 13 acquires, from the touch panel provided on the surface of the display screen of the display section 17, data representing an input position on the touch panel and updates the position data D1$a$ using the data representing the input position.

Next, the CPU 13 performs a reception process in accordance with the position of the tag 2 (step 43), and the processing proceeds to the next step. For example, if the CPU 13 acquires data representing an input position that is not managed by the CPU 13 in the above step 42, the CPU 13 performs the process of receiving data from the tag 2 placed such that the contact position of the tag 2 is the input position, and storing the received data in the reception data D1$b$. For example, the CPU 13 sequentially supplies power to antennas related to the newly detected contact position (antennas capable of communicating with the tag 2 placed at the contact position), thereby attempting near field communication with an object (for example, the tag 2) placed at the contact position. For example, as described with reference to FIG. 6, if the position where the CPU 13 can communicate using the antennas 115 and 124 is detected as a new contact position, the CPU 13 sequentially supplies power to the antennas 115 and 124, thereby communicating with the tag 2 capable of performing near field communication via the antennas 115 and 124. Then, the CPU 13 acquires the shared data from the tag 2 and stores the acquired shared data in the reception data D1$b$.

Next, the CPU 13 sets tag data acquired in the near field communication (step 44), and the processing proceeds to the next step. For example, the CPU 13 compares the shared data acquired in the near field communication in the above step 43 and determines that the tag 2 having transmitted common shared data is the tag placed at the above contact position. Then, based on the shared data transmitted from the tag 2 placed at the above contact position, the CPU 13 determines that the tag 2 having the shared data is placed at the above contact position. Then, the CPU 13 stores and manages the contact position of the tag 2 and the shared data of the tag 2 in the tag data D1$c$. It should be noted that if the tag contact position data D1$c$1 managed at the current moment disappears in the position data acquired in the above step 42, the CPU 13 may erase the tag data D1$c$ managed in the tag contact position data D1$c$1 in the above step 44. Further, if there is not a tag 2 having transmitted common shared data in the near field communication, the CPU 13 does not update the tag data D1$c$, and the processing proceeds to the next step.

Next, the CPU 13 determines whether or not the game is to be started (step 45). For example, with reference to operation data acquired from the input section 16, if the user performs the operation of starting the game, using the input section 16, the CPU 13 determines that the game is to be started. Then, if the game is to be started, the processing proceeds to step 46. If, on the other hand, the game is not to be started, the CPU 13 returns to the above step 42 and repeats the process thereof In step 46, the CPU 13 acquires, from the input section 16 (the touch panel), data regarding an operation indication position (a contact position) on the display screen of the display section 17, and the processing proceeds to the next step. For example, the CPU 13 acquires, from the touch panel provided on the surface of the display screen of the display section 17, data representing an input position on the touch panel and updates the position data D1$a$ using the data representing the input position.

Next, the CPU 13 determines whether or not there is a change in the data representing the input position acquired in the above step 46 (step 47). For example, the CPU 13 compares the input position acquired in the above step 46 with the contact position of each tag 2 managed in the tag contact position data D1c1. If there is a difference between the input position and the contact position, the CPU 13 determines that there is a change in the data representing the input position. Then, if there is a change in the data representing the input position, the processing proceeds to step 48. If, on the other hand, there is no change in the data representing the input position, the processing proceeds to step 63 (see FIG. 12).

In step 48, the CPU 13 determines whether or not the data representing the input position acquired in the above step 46 indicates a reduction in the input position. For example, the CPU 13 compares the input position acquired in the above step 46 with the contact position of each tag 2 managed in the tag contact position data D1c1. If the input position acquired in the above step 46 is smaller, the CPU 13 determines that the data representing the input position indicates a reduction in the input position. Then, if the data representing the input position indicates a reduction in the input position, the processing proceeds to step 49. If, on the other hand, the data representing the input position does not indicate a reduction in the input position, the processing proceeds to step 50.

In step 49, the CPU 13 erases tag data regarding the reduced input position, the processing proceeds to step 50. For example, the CPU 13 extracts, from the contact position of each tag 2 managed in the tag contact position data D1c1, a contact position that is not included in the input position acquired in the above step 46. Then, the CPU 13 erases the tag data D1c of the tag placed at the extracted contact position.

In step 50, the CPU 13 determines whether or not the data representing the input position acquired in the above step 46 indicates an increase in the input position. For example, the CPU 13 compares the input position acquired in the above step 46 with the contact position of each tag 2 managed in the tag contact position data D1c1. If the input position acquired in the above step 46 is larger, the CPU 13 determines that the data representing the input position indicates an increase in the input position. Then, if the data representing the input position indicates an increase in the input position, the processing proceeds to step 51. If, on the other hand, the data representing the input position does not indicate an increase in the input position, the processing proceeds to step 61 (see FIG. 12).

In step 51, the CPU 13 performs a reception process in accordance with the increased input position, and the processing proceeds to the next step. For example, the CPU 13 performs the process of receiving data from the tag 2 placed such that the contact position of the tag 2 is the increased input position. It should be noted that the reception process performed in the above step 51 is similar to the reception process in step 43 described above and therefore is not described in detail here.

Next, the CPU 13 adds and manages tag data acquired in near field communication in the above step 51 (step 52), and the processing proceeds to step 61 (see FIG. 12). For example, based on the shared data transmitted from the tag 2 placed such that the contact position of the tag 2 is the increased input position, the CPU 13 determines that the tag 2 having the shared data is placed at the above contact position. Then, the CPU 13 adds the contact position of the tag 2 and the shared data of the tag 2 to the tag data D1c and manages the tag data D1c. It should be noted that if there is not a tag 2 having transmitted common shared data in the near field communication, the CPU 13 does not add the tag data D1c, and the processing proceeds to the next step.

Further, if it is assumed that the tag 2 placed such that the contact position of the tag 2 is the increased input position is the tag erased in the process of step 49 immediately before this process, the CPU 13 may add tag data using the erased tag data (by changing the tag contact position data D1c1).

Referring to FIG. 12, in step 61, the CPU 13 determines whether or not the data representing the input position acquired in the above step 46 indicates the movement of the input position. For example, if the input position acquired in the above step 46 indicates that any one of the contact positions of tags 2 managed in the tag contact position data D1c1 moves (for example, if the operation of dragging the touch panel is performed), the CPU 13 determines that the data representing the input position indicates the movement of the input position. Then, if the data representing the input position indicates the movement of the input position, the processing proceeds to step 62. If, on the other hand, the data representing the input position does not indicate the movement of the input position, the processing proceeds to step 63.

In step 62, the CPU 13 updates the contact position of the tag 2 using the moved input position, the processing proceeds to step 63. For example, the CPU 13 extracts, from the contact position of each tag 2 managed in the tag contact position data D1c1, the contact position having moved according to the determination in the above step 61. Then, the CPU 13 sets as the extracted contact position the input position having moved according to the determination and updates the tag data D1c of the tag 2.

In step 63, the CPU 13 determines whether or not the current moment is the timing when tag data is periodically confirmed. Then, if the current moment is the timing when tag data is periodically confirmed, the processing proceeds to step 64. If, on the other hand, the current moment is not the timing when tag data is periodically confirmed, the processing proceeds to step 67.

In step 64, the CPU 13 acquires, from the input section 16 (the touch panel), data regarding an operation indication position (a contact position) on the display screen of the display section 17, and the processing proceeds to the next step. For example, the CPU 13 acquires, from the touch panel provided on the surface of the display screen of the display section 17, data representing an input position on the touch panel and updates the position data D1a using the data representing the input position.

Next, the CPU 13 performs a reception process on all the input positions acquired in the above step 64 (step 65), and the processing proceeds to the next step. For example, the CPU 13 performs the process of attempting to receive data from each of the tags 2 placed such that all the input positions acquired in the above step 64 are contact positions. For example, the CPU 13 sequentially supplies power to an antenna related to a contact position corresponding to one of the input positions (an antenna capable of communicating with the tag 2 placed at this contact position), thereby attempting near field communication with an object (for example, the tag 2) placed at this contact position. Then, the CPU 13 performs the near field communication at each of all the positions acquired in the above step 64. It should be noted that the reception process performed on each contact position in the above step 65 is similar to the reception process in the above step 43 and therefore is not described in detail here.

Next, the CPU 13 updates the tag data D1c using the data acquired in the near field communication (step 66), and the processing proceeds to step 67. For example, the CPU 13 compares the shared data acquired in the near field communication in step 43 with respect to each of the input positions (with respect to each of the contact positions) and determines that the tag 2 having transmitted common shared data is the tag placed at the input positions (the contact position). Then, based on the shared data transmitted from the tag 2 placed at the contact position, the CPU 13 determines that the tag 2 having the shared data is placed at the contact position. Then, the CPU 13 stores and manages the contact position of the tag 2 and the shared data of the tag 2 in the tag data D1c. Such a determination and data management are performed with respect to each of all the input positions acquired in the above step 64, thereby ultimately updating the tag data D1c of each of all the input positions acquired in the above step 64. It should be noted that if there is not a tag 2 having transmitted common shared data at a certain input position in the near field communication, the CPU 13 does not set the tag data D1c corresponding to this input position.

In step 67, based on the managed tag data, the CPU 13 performs game processing, and the processing proceeds to the next step. For example, the CPU 13 performs the process of advancing the game in accordance with the placement position, the type, the situation, and the like of each tag 2, using the contact position of the tag 2 (the tag contact position data D1c1) and the shared data (the tag shared data D1c2) that are stored in the tag data D1c.

Next, the CPU 13 performs a display control process based on the managed tag data, and the processing proceeds to the next step. For example, the CPU 13 performs the process of generating a game image corresponding to the placement position, the type, the situation, and the like of each tag 2, using the contact position of the tag 2 (the tag contact position data D1c1) and the shared data (the tag shared data D1c2) that are stored in the tag data D1c, and displaying the generated game image on the display section 17. For example, the CPU 13 generates an image representing a character or the like corresponding to the type of the placed tag 2 and causes the image to appear at a position corresponding to the contact position of the tag 2 on the display screen of the display section 17.

Next, the CPU 13 determines whether or not data is to be transmitted to the tag 2 (step 69). For example, in accordance with the progress state of the game, if it is time to transmit data representing the result and the situation of the game to at least one tag 2, the processing proceeds to step 70. If, on the other hand, it is not time to transmit data to the tag 2, the processing proceeds to step 71.

In step 70, the CPU 13 performs the process of generating transmission data to be transmitted to the tag 2 and transmitting the transmission data to the tag 2, and the processing proceeds to step 71. For example, the CPU 13 generates transmission data to be transmitted to the tag 2 and stores the transmission data in the transmission data D1e. Then, with reference to the tag data D1c, the CPU 13 acquires the contact position of the tag 2 as the transmission destination to which the generated transmission data is to be transmitted. Then, the CPU 13 supplies power to an antenna capable of transmitting data to the tag 2 at the contact position, thereby transmitting the transmission data to the tag 2 as the transmission destination. It should be noted that the transmission data to be stored in the transmission data D1e may be stored in the transmission data D1e before the above step 70 is performed.

In step 71, the CPU 13 determines whether or not the game is to be ended. In the above step 71, examples of conditions for ending the game include: the fact that the result of the above game is settled; and the fact that the user performs the operation of ending the game. If the game is not to be ended, the CPU 13 returns to the above step 46 and repeats the process thereof. If the game is to be ended, the CPU 13 ends the processing of the flow chart. Then, the CPU 13 repeatedly performs the series of processes of steps 46 to 71 until it is determined in step 71 that the game is to be ended.

It should be noted that in data transmitted from the information processing apparatus 1 to the tag 2, the tag 2 may sort only transmission data addressed to the tag 2. For example, an ID with which the information processing apparatus 1 specifies a transmission destination (for example, a unique ID) is assigned to transmission data, and the transmission data is transmitted to the tag 2. Then, only if the same ID as the unique ID of the tag 2 is assigned to the transmission data, the tag 2 acquires the transmission data. The tag 2 thus sorts transmission data, whereby, even if a plurality of tags 2 are present in the range where a single antenna can communicate, it is possible to transmit transmission data only to a tag 2 selected from among the plurality of tags 2. It should be noted that in order for the tag 2 to perform the above process of sorting transmission data, for example, a processing unit, i.e., a CPU or the like, may be mounted on the tag 2.

In addition, in the above exemplary embodiment, an example has been used where, when the information processing apparatus 1 and the tag 2 perform near field communication with each other, the information processing apparatus 1 functions as an initiator-side wireless communication apparatus for causing the tag 2 to generate an electromotive force by electromagnetic induction, and the tag 2 functions as a wireless communication apparatus as a target of the information processing apparatus 1 when near field communication is performed. Alternatively, the near field communication may be performed in another form. For example, the tag 2 may be a device having a power supply and an NFC card emulation function, and only the tag 2 or both the information processing apparatus 1 and the tag 2 may be a device having a card emulation function. In this case, the tag 2 can function as an initiator-side wireless communication apparatus. Thus, using data transmitted from the tag 2 as a trigger, it is possible to determine the contact position of the tag 2 having transmitted the data and manage information indicated by the data and the contact position.

In addition, the above exemplary embodiment has used, as an example, near field communication (proximity-type contactless communication) for bringing the information processing apparatus 1 and the tag 2 into proximity to each other to perform wireless communication based on the NFC standard. Alternatively, the exemplary embodiment may be applied to an information reading system where near field communication is performed based on other standards. For example, the exemplary embodiment can be applied also to an information reading system for performing wireless communication at a communication distance classified into a vicinity type, a remote type, a short distance type, or the like as well as the proximity type in contactless near field communication. Further, each of the information processing apparatus 1 and the communication terminal apparatus 2 may be any apparatus. For example, each of the information processing apparatus 1 and the tag 2 may be a stationary game apparatus, a mobile game apparatus, a general personal computer, any mobile electronic device (a PDA (Personal Digital Assistant), a mobile phone, a personal computer, a camera, or the like), or the like, or may be an information reading system for performing wireless communication by the combination of an apparatus and an electronic key.

In addition, the above descriptions have been given using an example where the information processing apparatus 1 and the tag 2 each perform a communication process and information processing. Alternatively, another apparatus may perform at least some of the processing steps. For example, if the information processing apparatus 1 is further configured to communicate with another apparatus (e.g., another server, another image display apparatus, another game apparatus, or another mobile terminal), the other apparatus may cooperate to perform the processing steps of the processing. Another apparatus may thus perform at least some of the processing steps, which enables processing similar to that described above. Further, the communication process and the information processing described above can be performed by a processor or the cooperation of a plurality of processors, the processor or the plurality of processors included in an information reading system including at least one information processing apparatus. Further, in the above exemplary embodiment, a communication process and information processing can be performed by the CPU 13 of the information processing apparatus 1 executing a predetermined program. Alternatively, part or all of the processing of the flow charts may be performed by a dedicated circuit included in the information processing apparatus 1.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the above program may be supplied to the information processing apparatus 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as, for example, an information reading system, an information reading apparatus, an information reading program, an information reading method, and the like in order, for example, to enable processing using the positional relationship with an information storage medium or a device.

What is claimed is:

1. An information reading system for performing near field communication with an information storage medium, the information reading system comprising:
  an antenna structure including a plurality of antenna coils, each arranged across at least one of other antenna coils, thereby forming, in a matrix manner, a plurality of overlapping areas where reading areas of the antenna coils each overlap at least one of reading areas of the other antenna coils; and
  a touch panel provided near the antenna structure and configured to detect a position of the information storage medium; and
  a computer processor configured to
    perform near field communication with the information storage medium in each of the reading areas, thereby reading information from the information storage medium in proximity to each of the reading areas,
    acquire the position of the information storage medium using a result of the detection by the touch panel, and read information stored in the information storage medium in accordance with the position detected by the touch panel, using near field communication via the antenna coil, and
    based on the read information, determine an image to be displayed that corresponds to the information storage medium at the position detected by the touch panel.

2. The information reading system according to claim 1, wherein
  information is read from the information storage medium via, among the plurality of antenna coils, an antenna coil corresponding to the position of the information storage medium detected by the touch panel.

3. The information reading system according to claim 2, wherein
among the plurality of antenna coils, in a pair of antenna coils of which the reading areas cross each other at or near the position of the information storage medium detected by the touch panel, information is read from the information storage medium via one of the pair, and then, information is read from the information storage medium via an other of the pair.

4. The information reading system according to claim 3, wherein
information redundant between the information read via the one of the pair and the information read via the other of the pair is acquired as information obtained from the information storage medium present in or near an overlapping area where the reading areas cross each other.

5. The information processing system according to claim 1, further comprising a placement portion on which the information storage medium is placed, wherein
the antenna coils are provided in the placement portion.

6. The information reading system according to claim 1, wherein
a plurality of information storage media are placed so that the plurality of information storage media perform near field communication, and
information from the plurality of information storage media present in the overlapping areas is managed with respect to each of the overlapping areas.

7. The information reading system according to claim 1, wherein
the computer processor is further configured to perform near field communication with the information storage medium via the plurality of antenna coils, and
the computer processor reads information from the information storage medium performing near field communication.

8. The information reading system according to claim 1, wherein
based on an antenna coil reading information, the computer processor detects a position of the information storage medium from which the information is read.

9. The information reading system according to claim 8, wherein
among the plurality of antenna coils, in a pair of antenna coils of which the reading areas cross each other at or near the position of the information storage medium detected based on the reading areas, information is read from the information storage medium via one of the pair, and then, information is read from the information storage medium via an other of the pair.

10. The information reading system according to claim 1, wherein
the computer processor is further configured to display on a display screen an image based on the read information.

11. The information reading system according to claim 10, wherein
the display screen is provided near the antenna structure, and
an image corresponding to the position of the information storage medium from which the information is read is displayed on the display screen.

12. An information reading apparatus for performing near field communication with an information storage medium, the information reading apparatus comprising:
an antenna structure including a plurality of antenna coils, each arranged across at least one of other antenna coils, thereby forming, in a matrix manner, a plurality of overlapping areas where reading areas of the antenna coils each overlap at least one of reading areas of the other antenna coils; and
a touch panel provided near the antenna structure and configured to detect a position of the information storage medium; and
a computer processor configured to
perform near field communication with the information storage medium in each of the reading areas, thereby reading information from the information storage medium in proximity to each of the reading areas,
acquire the position of the information storage medium using a result of the detection by the touch panel, and read information stored in the information storage medium in accordance with the position detected by the touch panel, using near field communication via the antenna coil; and
based on the read information, determine an image to be displayed that corresponds to the information storage medium at the position detected by the touch panel.

13. A non-transitory computer-readable storage medium having stored therein an information reading program to be executed by a computer included in an information reading apparatus for performing near field communication with an information storage medium,
the information reading apparatus comprising
an antenna structure including a plurality of antenna coils, each arranged across at least one of other antenna coils, thereby forming, in a matrix manner, a plurality of overlapping areas where reading areas of the antenna coils each overlap at least one of reading areas of the other antenna coils; and
a touch panel provided near the antenna structure and configured to detect a position of the information storage medium; and
the information reading program causing the computer to execute
performing near field communication with the information storage medium in each of the reading areas, thereby reading information from the information storage medium in proximity to each of the reading areas, wherein
acquiring the position of the information storage medium using a result of the detection by the touch panel, and reading information stored in the information storage medium in accordance with the position detected by the touch panel, using near field communication via the antenna coil; and
based on the read information, determining an image to be displayed that corresponds to the information storage medium at the position detected by the touch panel.

14. An information reading method for performing near field communication with an information storage medium, the information reading method comprising
using an antenna structure including a plurality of antenna coils, each arranged across at least one of other antenna coils, thereby forming, in a matrix manner, a plurality of overlapping areas where reading areas of the antenna coils each overlap at least one of reading areas of the other antenna coils; and a touch panel provided near the antenna structure and configured to detect a position of the information storage medium; and each of the reading areas, performing near field communication with the information storage medium in each of the reading areas, thereby reading information from the information storage medium in proximity to each of the reading areas, acquiring the position of the information storage medium using a result of the detection by the touch panel, and reading information stored in the information storage medium in accordance with the position detected by the touch panel, using near field communication via the antenna coil; and based on the read information, determining an image to be displayed that corresponds to the information storage medium at the position detected by the touch panel.

* * * * *